(12) United States Patent
Wei et al.

(10) Patent No.: US 12,159,004 B2
(45) Date of Patent: Dec. 3, 2024

(54) TOUCH PANEL AND TOUCH DISPLAY DEVICE

(71) Applicants: Wuhan Tianma Microelectronics Co., Ltd., Wuhan (CN); Wuhan Tianma Microelectronics Co., Ltd. Shanghai Branch, Shanghai (CN)

(72) Inventors: Qibing Wei, Wuhan (CN); Yingying Wu, Wuhan (CN); Peng Zhang, Wuhan (CN); Xingyao Zhou, Wuhan (CN); Wei Liu, Wuhan (CN)

(73) Assignees: Wuhan Tianma Microelectronics Co., Ltd., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/079,217

(22) Filed: Dec. 12, 2022

(65) Prior Publication Data

US 2023/0115692 A1    Apr. 13, 2023

(30) Foreign Application Priority Data

May 31, 2022    (CN) ............................ 202210613245

(51) Int. Cl.
*G06F 3/041*    (2006.01)
*G06F 3/044*    (2006.01)

(52) U.S. Cl.
CPC ........ *G06F 3/04164* (2019.05); *G06F 3/0445* (2019.05); *G06F 3/0446* (2019.05); *G06F 2203/04107* (2013.01); *G06F 2203/04111* (2013.01)

(58) Field of Classification Search
None
See application file for complete search history.

(56) References Cited

U.S. PATENT DOCUMENTS

| | | | |
|---|---|---|---|
| 10,712,859 B2 * | 7/2020 | Hu | ......................... G06F 3/0448 |
| 2011/0025636 A1 * | 2/2011 | Ryu | ....................... G06F 3/0445 |
| | | | 345/173 |

(Continued)

FOREIGN PATENT DOCUMENTS

CN    103440061 A    12/2013

*Primary Examiner* — Patrick N Edouard
*Assistant Examiner* — Peijie Shen
(74) *Attorney, Agent, or Firm* — KDW Firm PLLC

(57) ABSTRACT

A touch panel includes first touch-electrodes and second touch-electrodes, and a bezel region includes first wires and second wires. Each of the first wires is electrically connected a respective one of the first touch-electrodes in a one-to-one correspondence through a respective first connection end, and each of the second wires is electrically connected a respective one of the second touch-electrodes in a one-to-one correspondence through a respective second connection end. First connection ends of at least two adjacent first sub-touch-electrodes located at a central position of the touch region in the second direction are located at a same side of the touch region in the first direction, and/or second connection ends of at least two adjacent second sub-touch-electrodes located at a central position of the touch region in the first direction are located at a same side of the touch region in the second direction.

10 Claims, 16 Drawing Sheets

(56) References Cited

U.S. PATENT DOCUMENTS

| | | | |
|---|---|---|---|
| 2013/0241850 A1* | 9/2013 | Ito | G06F 3/045 |
| | | | 345/173 |
| 2014/0035599 A1* | 2/2014 | Shimata | G01R 27/2605 |
| | | | 29/850 |
| 2014/0118298 A1* | 5/2014 | Han | G06F 3/0443 |
| | | | 345/174 |
| 2016/0239131 A1* | 8/2016 | Kang | G06F 3/0443 |
| 2017/0024060 A1* | 1/2017 | Seong | G06F 3/0446 |
| 2018/0181234 A1* | 6/2018 | Hammura | G06F 3/0446 |
| 2018/0239466 A1* | 8/2018 | Yan | G06F 3/0412 |
| 2018/0307346 A1* | 10/2018 | Lee | G06F 3/0446 |
| 2019/0018524 A1* | 1/2019 | Shiojiri | G06F 3/0446 |
| 2019/0339816 A1* | 11/2019 | Hsu | G06F 3/0446 |
| 2020/0285330 A1* | 9/2020 | Xu | G06F 3/0445 |
| 2020/0301544 A1* | 9/2020 | Jeong | G06F 3/04164 |
| 2021/0208715 A1* | 7/2021 | Yang | H10K 50/82 |
| 2022/0187949 A1* | 6/2022 | Ito | G06F 3/04164 |
| 2022/0276735 A1* | 9/2022 | Pu | G06F 3/0445 |
| 2022/0317809 A1* | 10/2022 | Zhang | G06F 3/0448 |
| 2022/0382396 A1* | 12/2022 | Toyooka | G06F 3/044 |
| 2023/0068170 A1* | 3/2023 | Kadowaki | G06F 3/0418 |
| 2023/0093856 A1* | 3/2023 | Kim | G06F 3/0443 |
| | | | 345/174 |
| 2023/0161427 A1* | 5/2023 | Fan | G06F 3/0446 |
| | | | 345/173 |
| 2023/0168757 A1* | 6/2023 | Wu | G06F 3/041 |
| | | | 345/174 |
| 2023/0376144 A1* | 11/2023 | Bok | G06F 3/0421 |

* cited by examiner

TOUCH PANEL AND TOUCH DISPLAY DEVICE

CROSS-REFERENCE TO RELATED APPLICATION(S)

This application claims priority to Chinese Patent Application No. 202210613245.6 filed May 31, 2022, the disclosure of which is incorporated herein by reference in its entirety.

FIELD

Embodiments of the present disclosure relate to the field of display technologies and, in particular, to a touch panel and a touch display device.

BACKGROUND

In recent years, all kinds of electronic products are developing towards the direction of easy operation, small volume and large screen size, especially there are more strict requirements for volume and screen size of the portable electronic products. Therefore, many electronic products have been integrated with touch display panels to save the space needed for keyboard or keys thereof, thus expanding the screen area.

In the touch panel design of wearable products such as smart watches in the related art, for touch-electrodes at different positions, wires are prone to be entered from two sides of the touch panel, and then to be winded in the bezel region, such that the wires are connected to a flexible printed circuit board. It can be understood that the length of the winded wire entering from a side far away from the flexible circuit board is longer and the impedance thereof is larger, while the length of the winded wire entering from a side close to the flexible circuit board is shorter and the impedance thereof is smaller. However, when the above-mentioned touch panel encounters large static electricity, due to the large difference in impedance of various winded wires, the winded wire with lower impedance will be preferentially damaged, which will greatly lower the anti-static-electricity capability of the entire touch panel.

SUMMARY

Embodiments of the present disclosure provide a touch panel, including: a touch region and a bezel region surrounding the touch region, and further including multiple first touch-electrodes and multiple second touch-electrodes, where the multiple first touch-electrodes are insulated from the multiple second touch-electrodes.

The multiple first touch-electrodes extend along a first direction and are arranged in sequence along a second direction, and the multiple second touch-electrodes extend along the second direction and are arranged in sequence along the first direction, where the first direction intersects with the second direction.

The bezel region includes multiple first wires and multiple second wires, each of the multiple first touch-electrodes includes a first connection end, each of the multiple second touch-electrodes includes a second connection end, each of the multiple first wires is electrically connected to a respective one of the multiple first touch-electrodes in a one-to-one correspondence through a respective first connection end, and each of the multiple second wires is electrically connected to a respective one of the multiple second touch-electrodes in a one-to-one correspondence through a respective second connection end.

The touch panel includes: at least part of the multiple first touch-electrodes, which intersect with all of the multiple second touch-electrodes, are first sub-touch-electrodes, and first connection ends of at least two adjacent first sub-touch-electrodes located at a central position of the touch region in the second direction are located at a same side of the touch region in the first direction; and/or, at least part of the multiple second touch-electrodes, which intersect with all of the multiple first touch-electrodes, are second sub-touch-electrodes, and second connection ends of at least two adjacent second sub-touch-electrodes located at a central position of the touch region in the first direction are located at a same side of the touch region in the second direction.

Embodiments of the present disclosure further provide a touch display device, including any touch panel described above.

DETAILED DESCRIPTION

Figure 1:
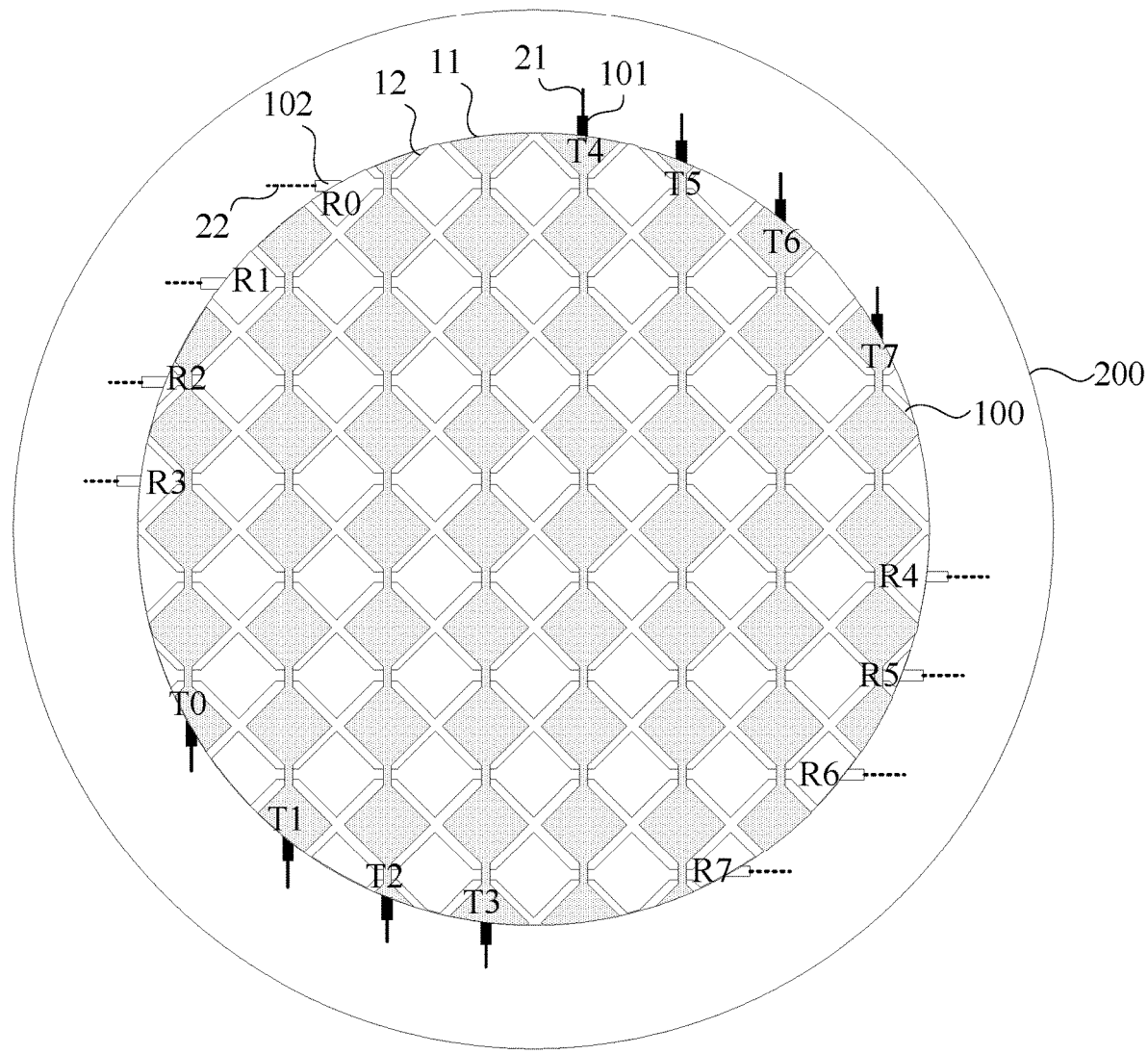
FIG. 1 is a structure diagram of a touch panel in the related art.

The present disclosure is further described hereinafter in detail in conjunction with drawings and embodiments. It is to be understood that embodiments described hereinafter are merely intended to explain the present disclosure and not to limit the present disclosure. Additionally, it is to be noted that for ease of description, only part, not all, of structures related to the present disclosure are illustrated in the drawings.

As described in the background art section, the related design of the touch panel has the problem of poor anti-static ability of the whole touch panel. FIG. 1 is a structural schematic diagram of a touch panel in the related art. Referring to FIG. 1, the touch panel in the related art includes a touch region 100 and a bezel region 200 surrounding the touch region 100, and further includes multiple first touch-electrodes 11 and multiple second touch-electrodes 12, where the multiple first touch-electrodes 11 are insulated from the multiple second touch-electrodes 12. In addition, the bezel region 200 includes multiple first wires 21 and multiple second wires 22 (which are illustrated by dashed lines in the figure and do not mean that the multiple second wires 22 have breakpoints), each of the multiple first touch-electrodes 11 includes a first connection end 101, each of the multiple second touch-electrodes 12 includes a second connection end 102, each of the multiple first wires 21 is electrically connected a respective one of the multiple first touch-electrodes 11 in a one-to-one correspondence through a respective first connection end 101, and each of the multiple second wires 22 is electrically connected a respective one of the multiple second touch-electrodes 12 in a one-to-one correspondence through a respective second connection end 12.

In the touch panel shown in FIG. 1, for example, the touch panel includes eight first touch-electrodes 11 and eight second touch-electrodes 12 which intersect each other to constitute a touch structure with mutual capacitance. Taking the first touch-electrodes 11 as touch driving electrodes and the second touch-electrodes 12 as touch sensing electrodes as an example, in FIG. 1, eight first touch-electrodes 11 are represented by T0-T7, and eight second touch-electrodes 12 are represented by R0-R7. After a touch driving signal is input into a first touch-electrode 11 (such as T4), and when a second touch-electrode 12 (such as R4) receives an electrical signal different from other second touch-electrodes 12, it is considered that a sensing signal is received by the eight second touch-electrode 12 (such as R4), it means that a touch action exists in a region near an intersection point of the eight first touch-electrode 11 and the second touch-electrode 12 (T4 and R4), that is, a touch signal can be feedback by a capacitance formed between the one of eight first touch-electrodes 11 and the one of eight second touch-electrodes 12 which are intersected each other, a touch position can be determined, and a corresponding touch instruction can be triggered. Based on the above driving principle, it is necessary to provide wires to connect each of the first touch-electrodes 11 and the second touch-electrodes 12 with a touch driving chip (not shown in the figure), so that a touch driving signal is provided for the first touch-electrodes 11 through the wires, and a touch sensing signal fed back by the second touch-electrodes 12 is received through the wires. In general, the wires connecting the first touch-electrodes 11 and the second touch-electrodes 12 are arranged in the bezel region 200, and the wires are generally arranged in accordance with a manner that the connection ends connected to the touch-electrodes are distributed evenly on the bezel region 200. In other words, as shown in FIG. 1, first wires 21 are led out from half of the first touch-electrodes 11 (such as T0-T3) from a lower side, and first wires 21 are led out from the other half of the first touch-electrodes 11 (such as T4-T7) from an upper side. Meanwhile, second wires 22 are led out from half of the second touch-electrodes 12 (such as R0-R3) from a left side, and second wires 22 are led out from the other half of the second touch-electrodes 12 (such as R4-R7) from a right side. In this case, in the bezel region 200, the connection ends connected to the touch-electrodes are evenly distributed in four regions. Connection ends of the first touch-electrodes 11 connected to the first wires 21 are first connection ends 101, and connection ends of the second touch-electrodes 12 connected to the second wires 22 are second connection ends 102. In such way, first connection ends 101 connected with T0-T3, second connection ends 102 connected with R0-R3, first connection ends 101 connected with T4-T7 and second connection ends 102 connected with R4-R7 are evenly distributed in different regions of the bezel region 200.

It can be understood that the upper side and the lower side and the left and right sides mainly depend on an extension direction of the first touch-electrodes 11 and an extension direction of the second touch-electrodes 12, and the connection ends of two parts of touch-electrodes evenly divided from the first touch-electrodes 11 and the connection ends of two parts of touch-electrodes evenly divided from the second touch-electrodes 12, which are connected to the wires, are arranged on two sides in the extension directions of the touch-electrodes. When the first touch-electrodes 11 extend along a longitudinal direction, wires are led out from the two parts of the first touch-electrodes 11 respectively from the upper side and the lower side, and when the second touch-electrodes 12 extend along a horizontal direction, wires are led out from two parts of the second touch-electrodes 12 from the left side and the right sides respectively.

The arrangement of the touch-electrodes of the touch panel as shown in FIG. 1 is only an exemplary related design. Other arrangements of the touch-electrodes may also be designed in a same manner. That is, same touch-electrodes are divided into two parts, and the connection ends of the two parts of the touch-electrodes connecting the two parts of the touch-electrodes and the wires are arranged on two sides of the extension direction of the touch-electrodes, so that the connection ends connected to the touch-electrodes in the bezel region are evenly distributed in four regions.

In the related design, since the wires needs to be connected to the touch driving chip, an access region (not shown in the figure) is generally arranged in the bezel region of the touch panel, that is, the wires connected to the touch-electrodes are aggregated and extended into the access region, and a flexible circuit board is bound to the access region to be connected to the touch driving chip. Taking FIG. 1 as an example, assuming that the access region is arranged on the upper side, it can be understood that the first connection ends 101 corresponding to T4-T7 (especially T4) are closer to the access region on the upper side, and the lengths of the first wires 21 corresponding to T4-T7 (especially T4) are shorter and the impedances thereof are smaller. On the contrary, the first connection ends 101 corresponding to T0-T3 (especially T3) are far away from the access region on the upper side, and the lengths of the first wires 21 corresponding to T0-T3 (especially T3) are longer and the impedances thereof are larger. It can be seen that the related design about the positions of the first connection ends 101, causes that a first wire 21 corresponding to T4 is the shortest and the impedance is the smallest, and a first wire 21 corresponding to T3 is the longest and the impedance is the largest. On other words, the impedances of various first wires 21 connected to the respective first touch-electrodes 11 are obviously different, therefore, in the case of there is static electricity, the static electricity is easier to and is prone to be discharged from the first wire 21 corresponding to T4 with the smallest impedance, which will damage the first wire 21 corresponding to T4 with a great probability, resulting in poor touch of the touch panel and reducing the anti-static ability of the whole touch panel.

Based on the above-mentioned technical problem, the embodiments of the present disclosure provide a touch panel. The touch panel includes a touch region and a bezel region surrounding the touch region, and further includes multiple first touch-electrodes and multiple second touch-electrodes. The multiple first touch-electrodes are insulated from the multiple second touch-electrodes. The multiple first touch-electrodes extend along a first direction, and are arranged along a second direction. The multiple second touch-electrodes extend along the second direction, and are arranged along the first direction. The first direction intersects with the second direction. The bezel region includes multiple first wires and multiple second wires, each of the multiple first touch-electrodes includes a first connection end, each of the multiple second touch-electrodes includes a second connection end, each of the multiple first wires is electrically connected a respective one of the multiple first touch-electrodes in a one-to-one correspondence through a respective first connection end, and each of the multiple second wires is electrically connected a respective one of the multiple second touch-electrodes in a one-to-one correspondence through a respective second connection end.

At least part of the multiple first touch-electrodes, which intersect with all of the multiple second touch-electrodes, are first sub-touch-electrodes, and first connection ends of two adjacent first sub-touch-electrodes of the sub-touch-electrodes at least located at a central position of the touch region in the second direction are located at a same side of the touch region in the first direction; and/or at least part of the multiple second touch-electrodes, which intersect with all of the multiple first touch-electrodes, are second sub-touch-electrodes, and second connection ends of two adjacent second sub-touch-electrodes of the sub-touch-electrodes at least located at a central position of the touch region in the first direction are located at a same side of the touch region in the second direction.

In the embodiments of the present disclosure, the first connection ends of at least two adjacent first sub-touch-electrodes located at the central position of the touch region in the second direction are located at the same side of the touch region in the first direction, and/or the second connection ends of at least two adjacent second sub-touch-electrodes located at the central position of the touch region in the first direction are located at the same side of the touch region in the second direction, so that in the first touch-electrodes arranged in the second direction, the first connection ends of the first touch-electrodes located at the central position and intersecting with all the second touch-electrodes are arranged on the same side, and in the second touch-electrodes arranged in the first direction, the second connection ends of the second touch-electrodes located at the central position and intersecting with all the first touch-electrodes are arranged on the same side, so that it can at least avoid the maximum impedance difference between the first wires correspondingly connected to the first touch-electrodes, and at least avoid the maximum impedance difference among the second wires correspondingly connected to the second touch-electrodes, thereby reducing the impedance difference among the wires in the touch panel, thereby preventing static electricity from discharging on fixed wires to a certain extent, and thereby preventing the fixed wires from being injured by static electricity. In such a way, the problem of poor touch of the touch panel is ameliorated, and the anti-static-electricity capability of the whole touch panel is improved.

Technical solutions in embodiments of the present disclosure are described clearly and completely below in conjunction with the drawings in embodiments of the present disclosure. Apparently, the embodiments described below are part, not all, of embodiments of the present disclosure. Based on the embodiments of the present disclosure, all other embodiments obtained by those of ordinary skill in the art without creative effort are within the protection scope of the present disclosure.

Figure 2:
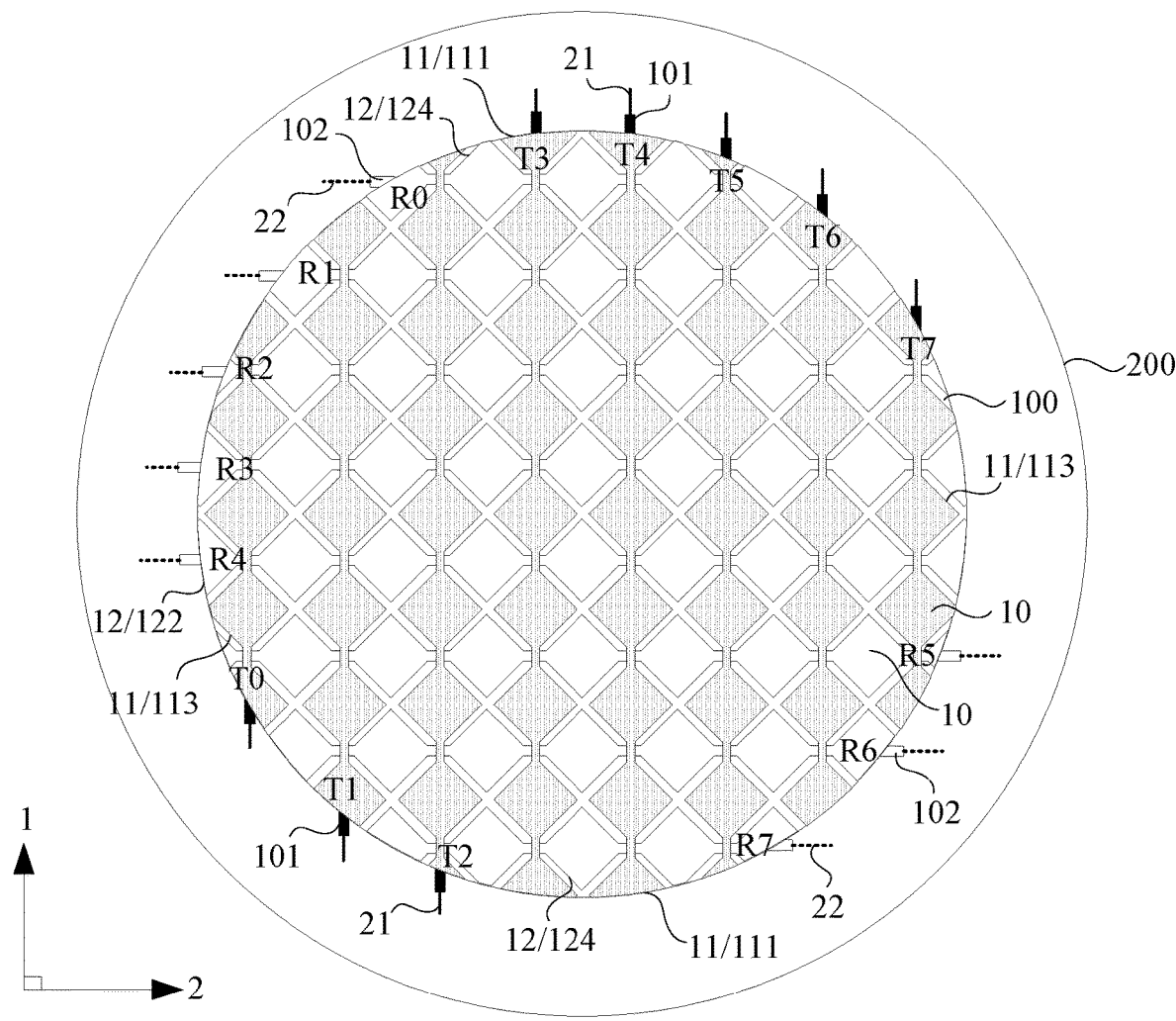
FIG. 2 is a structure diagram of a touch panel according to an embodiment of the present disclosure.

FIG. 2 is a structure diagram of a touch panel according to an embodiment of the present disclosure. Referring to FIG. 2, the touch panel includes a touch region 100 and a bezel region 200 surrounding the touch region 100, and further includes multiple first touch-electrodes 11 and multiple second touch-electrodes 12, where the multiple first touch-electrodes 11 are insulated from the multiple second touch-electrodes 12. The multiple first touch-electrodes 11 extend along a first direction 1 and are arranged in sequence along a second direction 2, and the multiple second touch-electrodes 12 extend along the second direction 2 and are arranged in sequence along the first direction 1, wherein the first direction 1 intersects with the second direction 2. The bezel region 200 includes multiple first wires 21 and multiple second wires 22, each of the multiple first touch-electrodes 11 includes a first connection end 101, each of the multiple second touch-electrodes 12 includes a second connection end 102, each of the multiple first wires 21 is electrically connected a respective one of the multiple first touch-electrodes 11 in a one-to-one correspondence through a respective first connection end 101, and each of the multiple second wires 22 is electrically connected a respective one of the multiple second touch-electrodes 12 in a one-to-one correspondence through a respective second connection end 102.

At least part of the multiple first touch-electrodes 11 that intersect with all of the multiple second touch-electrodes 12 are first sub-touch-electrodes 111, and first connection ends 101 of at least two adjacent first sub-touch-electrodes 111 located at a central position of the touch region 100 in the second direction 2 are located at a same side of the touch region 100 in the first direction 1; and/or at least part of the multiple second touch-electrodes 12 that intersect with all of the multiple first touch-electrodes 11 are second sub-touch-electrodes 122, and second connection ends 102 of at least two adjacent second sub-touch-electrodes 122 located at a central position of the touch region 100 in the first direction 1 are located at a same side of the touch region 100 in the second direction 2.

The first touch-electrode 11 intersecting with the second touch-electrode 12 means that the two types of touch-electrodes with different extension directions intersect each other. In order to ensure that the two touch-electrodes are insulated from each other, it is generally necessary to provide a cross-bridge structure. It is also noted that the intersection between the first touch-electrode 11 and the second touch-electrode 12 herein is mainly for the intersection within the touch region 100, and the intersection by extending the touch-electrodes to the bezel region will not be described herein.

Firstly, the first direction 1 is the column direction, the second direction 2 is the row direction, and the first direction 1 and the second direction 2 are perpendicular to each other. On this basis, the first touch-electrodes 11 and the second touch-electrodes 12 may be used as a touch driving electrode and a touch sensing electrode, respectively, to implement a touch operation, and the details are not repeated herein. Further, the first connection ends 101 represent connection ends for connecting the first wires 21 of the bezel region 200 to the first touch-electrodes 11, and the second connection ends 102 represent connection ends for connecting the second wires 22 of the bezel region 200 to the second touch-electrodes 12. The positions of the first connection ends 101 represents the positions where the first wires 21 are led out from the first touch-electrodes 11, and the positions of the second connection ends 102 represent the positions where the second wires 22 are led out from the second touch-electrodes 12.

As shown in FIG. 2, since the touch panel is circular, the length of a first touch-electrodes 11 arranged in the second direction 2 (i.e., in the row direction) and closer to the edge position, is less than the length of a first touch-electrodes 11 closer to the central position, and the length of a second touch-electrode 12 arranged in the first direction 1 (i.e., in the column direction) and closer to the edge position, is less than the length of a second touch-electrode 12 closer to the central position. As a result, the first touch-electrodes 11 (T0, T1, T6, and T7) do not intersect with at least one of the second touch-electrodes 12, and the second touch-electrodes 12 (R0, R1, R6, and R7) do not intersect with at least one of the first touch-electrodes 11. Since the lengths of the first touch-electrodes 11 (T2, T3, T4 and T5) which are arranged in the first direction 1 (i.e., in the column direction) and are closer to the central position, are longer, the first touch-electrodes 11 (T2, T3, T4 and T5) intersect with all the second touch-electrodes 12, and the lengths of the second touch-electrodes 12 (R2, R3, R4 and R5) which are arranged in the second direction 2 (i.e., in the row direction), and are closer to the central position, are longer, the second touch-electrodes 12 (R2, R3, R4 and R5) intersect with all the first touch-electrodes 11. In the embodiments of the present disclosure, the first touch-electrodes 11 intersecting with all the second touch-electrodes 12 are the first sub-touch-electrodes 111, the second touch-electrodes 12 intersecting with all the first touch-electrodes 11 are the second sub-touch-electrodes 122, and the first connection ends 101 of the first sub-touch-electrodes 111 located at the central position of the touch region 100 in all the first sub-touch-electrodes 111 are arranged on the same side in the first direction 1, and/or the second connection ends 102 of the second sub-touch-electrodes 122 located at the central position of the touch region 100 in all the second sub-touch-electrodes 122 are arranged on the same side in the second direction 2. In such way, the lead out positions of the first sub-touch-electrodes 111 located in the central position and the lead out positions of the second sub-touch-electrodes 122 located in the central position are arranged.

In some embodiments, two adjacent first sub-touch-electrodes 111 in the central position of the touch region 100 in the second direction 2 are two adjacent first sub-touch-electrodes 111 in the most central position among the first touch-electrodes 11 arranged in sequence in the touch region 100. In other words, since the touch panel is circular, two adjacent first sub-touch-electrodes 111 in the most central position can also be understood as two adjacent first sub-touch-electrodes 111 with the longest length. Taking the touch panel shown in FIG. 2 as an example, two adjacent first sub-touch-electrodes 111 with the longest length refer to T3 and T4. For the two adjacent first sub-touch-electrodes 111 with the longest length, in a case where the first wires 21 are led out from the two first sub-touch-electrodes 111 respectively on two sides of the first direction 1, as referring to FIG. 1, when the first connection end 101 of T3 is located at the lower side and the first connection end 101 of T4 is located at the upper side, the length difference between the two first wires 21 is largest among all wires of the touch panel, i.e., the impedance difference there between is the largest. In the embodiments of the present disclosure, the first connection ends 101 of the two adjacent first sub-touch-electrodes 111 with the longest length are disposed on the same side, that is, the wires are led out from the same side, and the maximum impedance difference between the two wires can be avoided. For all the first touch-electrodes 11, the maximum impedance difference among all the first wires 21 corresponding to all the first touch-electrodes 11 is reduced, thereby reducing the impedance difference of the first wires in the touch panel.

In some embodiments, the connection ends of the two adjacent first sub-touch-electrodes 111 (i.e., the two adjacent first sub-touch-electrodes 111 with the longest length), disposed in the central position are located at the same side, for example, both on the side close to the access region, or, both on the side far away from the access region. For the side close to the access region, the wires corresponding to the connection ends of the two first sub-touch-electrode 111 may be surrounded by the other wires in the bezel region, that is, the wires corresponding to the two first sub-touch-electrodes 111 may be disposed on the inner side. For the side far away from the access region, the wires corresponding to the connection ends of the two first sub-touch-electrodes 111 will surround the other wires of the bezel region, that is, the wires corresponding to the two first sub-touch-electrodes 111 will be disposed on the outer side. However, in the related art, the connection ends of the two adjacent first sub-touch-electrodes 111 with the longest length are provided on two sides, respectively, and the wires corresponding to the two adjacent first sub-touch-electrodes 111 may extend in different positions of the bezel region, resulting in a significant length difference between the two wires, and resulting in a significant difference in impedance between the two wires. In the above-mentioned the embodiments of the present disclosure, the connection ends of the two adjacent first sub-touch-electrode 111 with the longest length are located at the same side, so that the corresponding wires and wiring can be ensured to be basically consistent, and obvious differences in the lengths of the corresponding two wires can be avoided, thereby avoiding obvious differences in the impedances of the wires corresponding to various first touch-electrodes arranged in sequence, so that the anti-static-electricity capability of various wires would not be subjected to abrupt change, and the problem of poor anti-static-electricity capability of the whole touch panel caused by obvious differences in the anti-static-electricity capability of part of adjacent wires is avoided. In addition, in the embodiments of the present disclosure, the connection ends of two adjacent first sub-touch-electrodes 111 with the longest length are disposed on the same side, and in some embodiments, the connection ends are disposed on the same side close to the access region, so that the corresponding wires can be ensured to be surrounded by the other wires in the bezel region. For various first touch-electrode arranged in sequence, the wires with the smallest impedance are protected by the other wires, thereby ensuring the anti-static-electricity capability of the whole touch panel and reducing the risk of being damaged by static-electricity.

In addition, the lengths of the two adjacent first sub-touch-electrodes 111 located at the central position are the longest, that is, loads on the two adjacent first sub-touch-electrodes 111 are heaviest. From the structural view, the two first sub-touch-electrodes 111 bearing the heaviest load need to be disposed with the most cross-bridge structures, however the cross-bridge structures have the weakest anti-static-electricity capability. Therefore, the optimization and improvement to the anti-static-electricity capability of the first sub-touch-electrodes 111 leads to improvement to the most weakness of anti-static-electricity of the whole touch panel and enables the anti-static-electricity capability of the whole touch panel to be maximized. From the functional view, the lengths of the two adjacent first sub-touch-electrodes 111 located at the central position are the longest, and the number of second sub-touch-electrodes 111 which intersect with the two adjacent first sub-touch-electrodes 111 is the largest, the load on the capacitors are larger, which causes that instantaneous current is the largest during charging and discharging. The touch-electrodes with the largest load are more easily to be at risk at the same impedance difference, so that from this point of view, the anti-static-electricity capability of the first sub-touch-electrodes 111 can also maximize the anti-static-electricity capability of the whole touch system. On the basis of this, in the embodiments of the present disclosure, the connection ends of the two adjacent first sub-touch-electrodes 111 with the longest length are disposed on the same side, so that the problem of poor anti-static-electricity capability of the two first sub-touch-electrodes 111 can be remedied, and the problem of anti-static-electricity capability of the wires can be improved on the whole.

Similarly, it can be seen that for two adjacent second sub-touch-electrodes 122 arranged in the first direction 1 (i.e., the column direction) and located at the central position in the touch region 100, the second connection ends 102 connected to two adjacent second sub-touch-electrodes 122 are disposed on the same side of the touch region 100 in the second direction 2, so that the maximum impedance difference between two second wires 22 can be avoided, and for all the second touch-electrodes 12, the maximum impedance difference among all the second wires 22 correspondingly connected to all the second touch-electrodes 12 is reduced, thereby the impedance difference of the second wires in the touch panel can be reduced.

In summary, in the embodiments of the present disclosure, the impedance difference of the first wires and/or the impedance difference the second wires is reduced, which can prevent static electricity from discharging on the fixed wires to a certain extent, thereby avoiding the fixed wires from being injured by static electricity, ameliorated the poor touch problem of the touch panel, and improving the anti-static-electricity capability of the whole touch panel.

It should be noted that, the two adjacent first sub-touch-electrode 111 located at the most central position may be a first sub-touch-electrode 111 located at the central axis and a first sub-touch-electrode 111 adjacent to and closest to the first sub-touch-electrode 111 located at the central axis, or the two adjacent first sub-touch-electrode 111 located at the most central position may be two first sub-touch-electrodes 111 located at two sides of and closest to the central-axis. The two adjacent second sub-touch-electrodes 122 in the most central position are similar, and the details are not repeated herein.

In some embodiments, when the first touch-electrodes 11 and the second touch-electrodes 12 are evenly and symmetrically arranged on the touch panel, respectively, for both the first touch-electrodes 11 and the second touch-electrodes 12, the number of touch-electrodes determines the two adjacent touch-electrodes in the most central position. When the number of touch-electrodes is odd, a touch-electrode is located at the central axis, the two adjacent touch-electrodes in the most central position refer to a touch-electrode at the central axis and a touch-electrode adjacent to and closest to the touch-electrode at the central axis; and when the number of touch-electrodes is even, no touch-electrode is located at the central axis, and two adjacent touch-electrodes in the most central position refer to two touch-electrodes respectively located at two sides of and closest to the central-axis.

On the basis of the situations of two adjacent touch-electrodes in the most central position, with further reference to FIG. 2, in some embodiments, N1 first touch-electrodes 11 intersect with all the second touch-electrodes 12, and first connection ends 101 of M1 first sub-touch-electrodes 111 are located at a same side of the touch region 100 in the first direction 1, where N1 is a positive even integer, and N1 and M1 satisfy: M1>N1/2; and/or, N2 second touch-electrodes 12 intersect with all the first touch-electrodes 11, and second connection ends 102 of M2 second sub-touch-electrodes 122 are located at a same side of the touch region 100 in the second direction 2, where N2 is a positive even integer, and N2 and M2 satisfy: M2>N2/2.

The embodiments of the present application provide arrangements for the first connection ends 101 of the first sub-touch-electrodes 111 and the second connection ends 102 of the second sub-touch-electrodes 122, including that which first sub-touch-electrodes 111 in which the first connection ends 101 are arranged on the same side are selected, and which second sub-touch-electrodes 122 in which the second connection ends 102 are arranged on the same side are selected. Taking first touch-electrodes 11 extending in the longitudinal direction as an example, when the number of first touch-electrodes 11 intersecting with all the second touch-electrodes 12 is a positive even integer, that is, the number of first sub-touch-electrodes 111 is a positive even integer, two adjacent first sub-touch-electrodes 111 located at the central position are two first touch-electrodes 11, i.e., T3 and T4, respectively located on two sides of the central-axis and closest to the central-axis. In the embodiments of the present disclosure, the first connection ends 101 connected to the two first touch-electrodes 11, i.e., T3 and T4, are arranged on the same side of the touch region 100 in the first direction 1 (i.e., in the column direction), which shows as an example that the connection ends of T3 and T4 in FIG. 2 are located at the upper side. On this basis, the first connection ends 101 of the other part of the first sub-touch-electrodes 111 may also be arranged on the same side as the first connection ends 101 of the two first sub-touch-electrodes 111. In some embodiments, the first connection ends 101 of all the first sub-touch-electrode 111 located at the same side of the central-axis (such as T4 and all the first sub-touch-electrodes 111 on the right side of T4) may be arranged on the same side (i.e., the upper side) of the first direction 1. Meanwhile, since the connection end of T3 is also arranged on the upper side as the connection end of T4, the first connection ends 101 of part of the first sub-touch-electrodes 111 on the left side of T3 may also be arranged on the upper side. In this case, the first sub-touch-electrodes 111 of which the first connection ends 101 are located at the upper side should include at least T3 and all the first sub-touch-electrodes 111 on the right side of T3, where all the first sub-touch-electrodes 111 on the right side of T3 are substantially half the number of the first sub-touch-electrodes 111. Thus, the number (M1) of first touch-electrodes 11 of which the first connection ends 101 is located at the same side of the touch region 100 in the first direction 1 should be at least one more than half of the total number (N1) of the first sub-touch-electrodes 111. As shown in FIGS. 2, T0 and T1, and T6 and T7 do not intersect with at least one of the second touch-electrodes 12, and only four first touch-electrodes 11 (T2 to T5) intersect with all the second touch-electrodes 12, that is, T2 to T5 are the first sub-touch-electrodes 111. Then, the first connection ends 101 of at least three first sub-touch-electrodes 111 (T3 to T5) in the four first sub-touch-electrodes 111 (T2 to T5) are located at the upper side, that is, the number relationship between N1 and M1 is M1>N1/2. Taking the first touch-electrodes 11 extending in longitudinal direction as an example, the number relationship is also applicable to the second touch-electrodes 12 extending in the horizontal direction, that is, the number (M2) of second sub-touch-electrodes 122 of which the second connection ends 102 are located at the same side of the touch region 100 in the second direction 2 should be at least one more than half of the number (N2) of second sub-touch-electrodes 122, that is, M2>N2/2.

It is to be noted that taking the first touch-electrodes extending in the longitudinal direction as an example, the above arrangement of the first touch-electrodes 11 is provided to allows that the first connection ends 101 of the majority of the first touch-electrodes 11 are arranged on the same side. Compared with arranging the first wires 21 connected to the first touch-electrodes 11 to be located at two sides, arranging the first wires 21 connected to the first touch-electrode 11 to be located at the same side leads to that the length difference is small, and the impedance difference is small. On the basis that the majority of the first connection ends 101 of the first touch-electrodes 11 are located at the same side, it is possible to reduce the impedance difference among various first wires 21, and has positive effect for preventing static electricity from being discharged on the fixed wires. Same arrangements can be applied to the second touch-electrodes, which will not be described herein.

Figure 3:
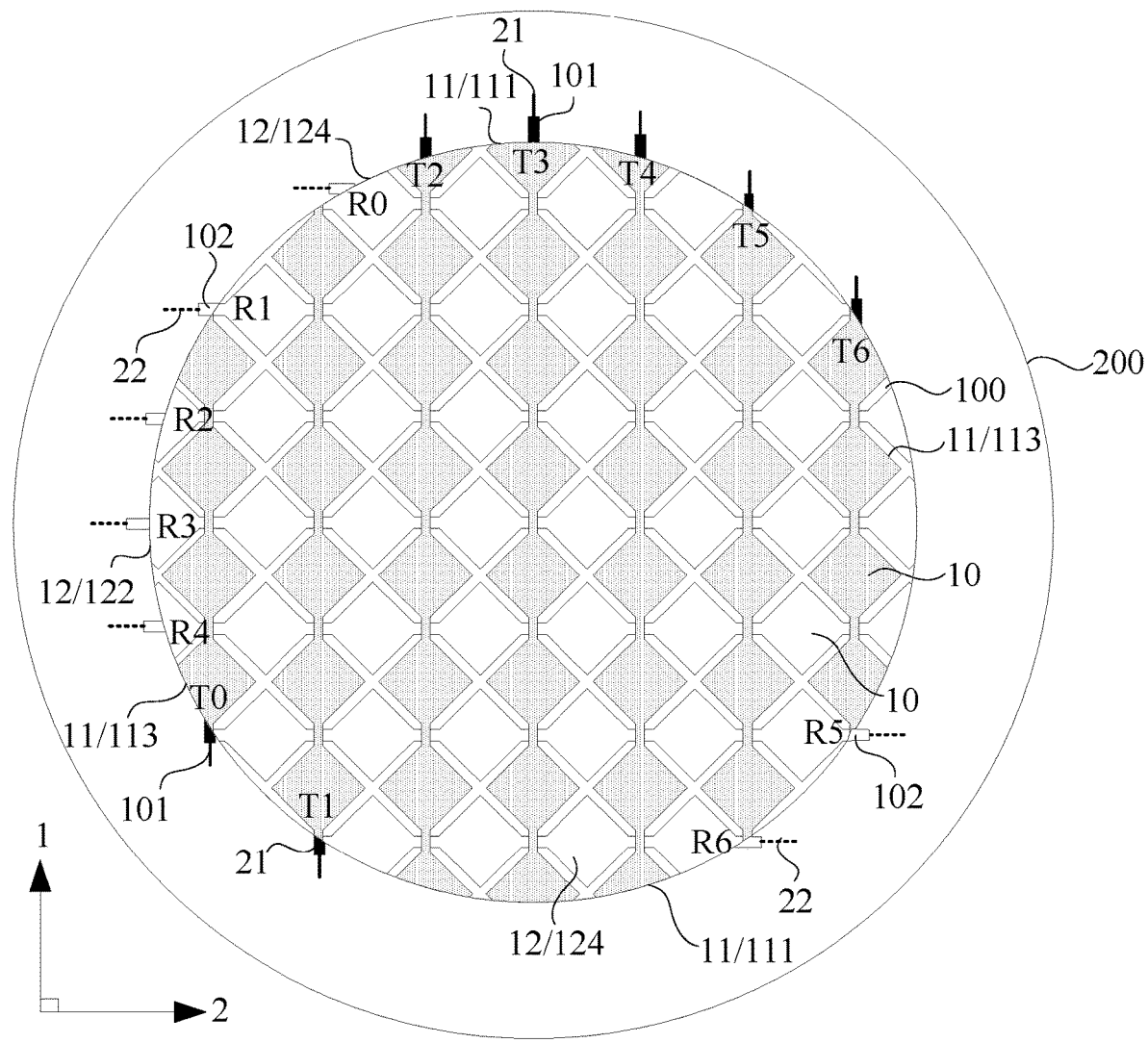
FIG. 3 is another structure diagram of a touch panel according to an embodiment of the present disclosure.

FIG. 3 is another structure diagram of a touch panel according to an embodiment of the present disclosure. Referring to FIG. 3, in some embodiments, N1 first touch-electrodes 11 intersect with all the second touch-electrodes 12, and first connection ends 101 of M1 first sub-touch-electrodes 111 are located at a same side of the touch region 100 in the first direction 1, where N1 is a positive odd integer, and N1 and M1 satisfy: M1≥(N1+1)/2; and/or, N2 second touch-electrodes 12 intersect with all the first touch-electrodes 11, and second connection ends 102 of M2 second sub-touch-electrodes 122 are located at a same side of the touch region 100 in the second direction 2, where N2 is a positive odd integer, and N2 and M2 satisfy: M2≥(N2+1)/2.

Still taking first touch-electrodes 11 extending in the longitudinal direction as an example, when the number of first touch-electrodes 11 intersecting with all the second touch-electrodes 12 is positive odd integer, that is, the number of first sub-touch-electrodes 111 is positive odd integer, two adjacent first sub-touch-electrodes 111 located at the central position is a first touch-electrode 11 located on the central-axis and a first touch-electrode 11 adjacent to and closest to the first touch-electrode 11 located on the centering (such as T4 and T5), that is, in the embodiments of the present disclosure, first connection ends 101 connected to the two first touch-electrodes 11 are arranged on the same side of the touch region in the first direction 1, i.e., the column direction. As shown in FIG. 3, connection ends of T4 and T5 are located at the upper side. On this basis, the first connection ends 101 of the other part of the first sub-touch-electrodes 111 may also be arranged on the same side as the first connection ends 101 of the two first touch-electrodes 11. In some embodiments, the first connection ends 101 of all the first sub-touch-electrode 111 located at the same side of the central-axis (such as all the first sub-touch-electrodes 111 on the right side of T4) are arranged on the same side (i.e., the upper side) of the first direction 1. Meanwhile, since the connection end of T4 is also arranged on the upper side, the first connection ends 101 of part of the first sub-touch-electrodes 111 on the left side of T4 may also be arranged on the upper side. Therefore, the first sub-touch-electrodes 111 of which the first connection ends 101 are located at the upper side should include at least T4 and all the first sub-touch-electrodes 111 on the right side of T4. In this case, the sum of T4 and all the first sub-touch-electrodes 111 on the right side of T4 is equal to half of the total number of the first sub-touch-electrodes 111 plus one. Thus, the number (M1) of first sub-touch-electrodes 11 of which the first connection ends 101 is located at the same side of the touch region 100 in the first direction 1 should be at least equal to half of the total number (N1) of the first sub-touch-electrodes 111 plus one. As shown in FIGS. 3, T0 and T1, and T7 and T8 do not intersect with at least one of the second touch-electrodes 12, and only five first touch-electrodes 11 of T2 to T6 intersect with all the second touch-electrodes 12, that is, T2 to T6 are the first sub-touch-electrodes 111. In this case, the first connection ends 101 of at least three first sub-touch-electrodes 111 (T4 to T6) in the five first sub-touch-electrodes 111 of T2 to T6 are located at the upper side, that is, the number relationship between N1 and M1 is M1≥(N1+1)/2. Similarly, the number relationship is also applicable to the second touch-electrodes 12 extending in the horizontal direction, that is, the number (M2) of second sub-touch-electrodes 122 of which the second connection ends 102 are located at the same side of the touch region 100 in the second direction 2 should be at least equal to half of the number (N2) of second sub-touch-electrodes 122 plus one, that is, M2≥(N2+1)/2.

No matter the number of first touch-electrodes 11 is a positive even integer or a positive odd integer, the above-mentioned embodiments aim to arrange the first connection ends 101 of the first sub-touch-electrodes 111 on the same side as much as possible to reduce the impedance differences among various first wires 21 and produce a positive effect on preventing static electricity to discharge through the fixed wires, which is similar for the second touch-electrodes and will not be described herein.

Figure 4:
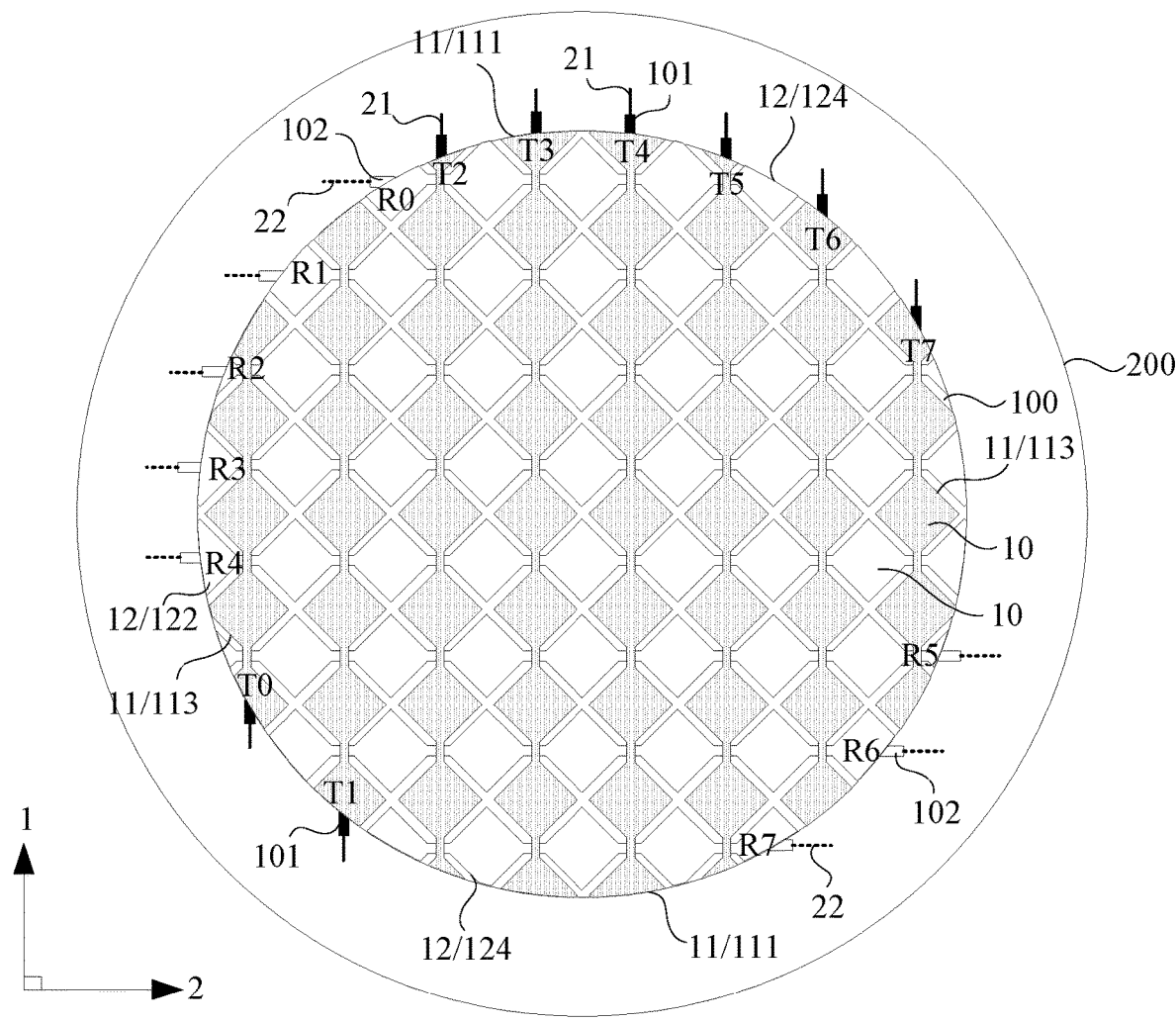
FIG. 4 is another structure diagram of a touch panel according to an embodiment of the present disclosure.

Eight first touch-electrodes and eight second touch-electrodes included in FIG. 2, as well as seven first touch-electrodes and seven second touch-electrodes included in FIG. 3, are an example only. The positions of the connection ends of the first sub-touch-electrodes 111 and the positions of the connection ends of the second sub-touch-electrodes 122 as shown in FIG. 2 or FIG. 3 are also an example. FIG. 4 is another structure diagram of a touch panel according to an embodiment of the present disclosure. Referring to FIG. 4, when the touch panel further includes other first sub-touch-electrodes 111 in addition to two adjacent first sub-touch-electrodes 111 in the central position, and connection ends of the other first sub-touch-electrodes 111 can be disposed on the same side as the connection ends of the first sub-touch-electrodes 111 in the central position. In other words, in addition to providing T3 to T7 on the upper side as shown in FIG. 2, a connection end of T2 can also be turned over to be disposed on the upper side. FIG. 2 and FIG. 3 are merely examples of touch-electrode arrays of 8×8 and 7×7, respectively, and in practical application, a touch-electrode array of 9×9 may also be provided. The embodiments of the present disclosure provide a detailed arrangement for the positions of the connection ends of the first touch-electrodes and the second touch-electrodes in 7×7, 8×8 and 9×9, as shown in Table 1.

Table 1 shows arrangements of positions of connection ends in different touch panel according to an embodiment of the present disclosure.

| Array design | First touch-electrode design | Second touch-electrode design |
|---|---|---|
| 7 × 7 | 5 + 2 | 4 + 3 |
|  | 5 + 2 | 5 + 2 |
|  | 4 + 3 | 4 + 3 |
|  | 4 + 3 | 5 + 2 |
| 8 × 8 | 6 + 2 | 4 + 4 |
|  | 6 + 2 | 6 + 2 |
|  | 5 + 3 | 4 + 4 |
|  | 5 + 3 | 6 + 2 |
| 9 × 9 | 6 + 3 | 5 + 4 |
|  | 6 + 3 | 6 + 3 |
|  | 6 + 3 | 7 + 2 |
|  | 5 + 4 | 5 + 4 |
|  | 5 + 4 | 6 + 3 |
|  | 5 + 4 | 7 + 2 |

The arrangements for positions of the connection ends in Table 1 is explained below by using a first touch-electrode design of 5+2 and a second touch-electrode design of 5+2 as examples. Referring to FIG. 3, the first touch-electrode design 5+2 indicates that the connection ends of the five first touch-electrodes in the 7×7 touch panel are located at the upper side, that is, the connection ends of T2 to T6 are located at the upper side, and connection ends of two first touch-electrodes are located at the lower side, that is, the connection ends of T0 and T1 are located at the lower side; and the second touch-electrode design 5+2 indicates that the connection ends of the five second touch-electrodes in the 7×7 touch panel are located at the left side, that is, the connection ends of R0 to R4 are located at the left side, and connection ends of two second touch-electrodes are located at the right side, that is, the connection ends of R5 and R6 are located at the right side. In such way, the arrangement for the connection ends of the touch panel shown in FIG. 2 may be treated as a first touch-electrode design of 5+3 and a second touch-electrode design of 5+3; and the arrangement for the connection ends of the touch panel shown in FIG. 4 may be treated as a first touch-electrode design of 6+2 and a second touch-electrode design of 5+3.

The embodiments of FIG. 2 described above in which the number of first sub-touch-electrodes and the number of second sub-touch-electrodes are both positive even integer and are equal, or the embodiments of FIG. 3 described above in which the number of first sub-touch-electrodes and the number of second sub-touch-electrodes are both positive odd integer and are equal, are applicable to a centrosymmetric touch panel such as a circular touch panel. Different scenes may exist in actual application, for example, when the touch panel is in shape with unequal length and width, such as in a rectangular shape or a rectangular-like shape, the number of the first touch-electrodes and the number of the second touch-electrodes may not be equal. In some embodiments, the number of first sub-touch-electrodes 111 is a positive even integer while the number of second sub-touch-electrode is a positive odd integer, or the number of first sub-touch-electrodes is a positive odd integer while the number of second sub-touch-electrodes 122 is a positive even integer. In these application scenes, the connection ends of the first sub-touch-electrodes and the connection ends of the second sub-touch-electrodes may still be arranged separately according to the above-mentioned number relationships. The number of first sub-touch-electrodes and the number of second sub-touch-electrodes does not have a restriction relationship with each other. For example, two arrangements described below are provided.

N1 first touch-electrodes 11 intersect with all the second touch-electrodes 12, and first connection ends 101 of M1 first sub-touch-electrodes 111 are located at a same side of the touch region 100 in the first direction 1, where N1 is a positive even integer, and N1 and M1 satisfy: M1>N1/2; and N2 second touch-electrodes 12 intersect with all the first touch-electrodes 11, and second connection ends 102 of M2 second sub-touch-electrodes 122 are located at a same side of the touch region 100 in the second direction 2, where N2 is a positive odd integer, and N2 and M2 satisfy: M2≥(N2+ 1)/2.

N1 first touch-electrodes 11 intersect with all the second touch-electrodes 12, and first connection ends 101 of M1 first sub-touch-electrodes 111 are located at a same side of the touch region 100 in the first direction 1, where N1 is a positive odd integer, and N1 and M1 satisfy: M1≥(N1+1)/2; and N2 second touch-electrodes 12 intersect with all the first touch-electrodes 11, and second connection ends 102 of M2 second sub-touch-electrodes 122 are located at a same side of the touch region 100 in the second direction 2, where N2 is a positive even integer, and N2 and M2 satisfy: M2>N2/2.

It can be understood that arrangements for the positions of the connection ends of the first sub-touch-electrodes and the connection ends of the second sub-touch-electrodes are mentioned above. The embodiments of the present disclosure also provides arrangements for the connection ends of the first touch-electrodes that does not intersect with all the second touch-electrodes (in other words, the connection ends of the first touch-electrodes do not intersect with at least one of the second touch-electrodes) and the connection ends of the second touch-electrodes that does not intersect with all the first touch-electrodes (in other words, the connection ends of the second touch-electrodes do not intersect with at least one of the first touch-electrodes). Referring to FIGS. 2 and 3, in some embodiments, at least part of the first touch-electrodes 11, which do not intersect with at least one of the second touch-electrodes 12, are third sub-touch-electrodes 113, at least part of the second touch-electrodes 12, which do not intersect with at least one of the first touch-electrodes 11, are fourth sub-touch-electrodes 124. A first connection end 101 of a third sub-touch-electrode 113 located at a first side of a center axis of the touch region 100 in the second direction 2 is located at a first side of the touch region 100 in the first direction 1, and a first connection end 101 of a third sub-touch-electrode 113 located at a second side of the center axis of the touch region 100 in the second direction 2 is located at a second side of the touch region 100 in the first direction 1. A second connection end 102 of a fourth sub-touch-electrode 124 located at a first side of a center axis of the touch region 100 in the first direction 1 is located at a second side of the touch region 100 in the second direction 2, and a second connection end 102 of a fourth sub-touch-electrode 124 located at a second side of the center axis of the touch region 100 in the first direction 1 is located at a first side of the touch region 100 in the second direction 2.

Taking FIG. 2 as an example, first touch-electrodes 11, i.e., the third sub-touch-electrodes 113, which does not intersect with all the second touch-electrodes 12 are T0 and T1, and T6 and T7, and second touch-electrodes 12, i.e., the fourth sub-touch-electrode 124, which does not intersect with all the first touch-electrodes 11 are R0 and R1, and R6 and R7. For first touch-electrodes 11 extending in the longitudinal direction, the third sub-touch-electrodes 113 (T0 and T1, and T6 and T7) are practically distributed on two sides of the longitudinal central axis (not shown), taking the left side as the first side as an example, first connection ends 101 of the third sub-touch-electrodes 113 (T0 and T1) located at the left side may be provided on the first side (the lower side) in the first direction 1, i.e., the column direction, and first connection ends 101 of the third sub-touch-electrodes 113 (T6 and T7) located at the right side may be provided on the second side (the upper side) in the first direction 1, i.e., the column direction. In other words, the first connection ends 101 of the third sub-touch-electrodes 113 adjacent to the longitudinal center axis in the longitudinal direction may be selectively disposed on the upper side and the lower side, respectively. Similarly, for second touch-electrodes 12 extending in the horizontal direction, the fourth sub-touch-electrodes 124 (R0 and R1, and R6 and R7) are distributed on two sides of the horizontal central axis (not shown), taking the lower side as the first side as an example, second connection ends 102 of the fourth sub-touch-electrodes 124 (R6 and R7) located at the lower side may be provided on the second side (the right side) in the second direction 2, i.e., the row direction, and second connection ends 102 of the fourth sub-touch-electrodes 124 (R0 and R1) located at the upper side may be provided on the first side (the left side) in the second direction 2, i.e., the row direction. In other words, the second connection ends 102 of the fourth sub-touch-electrodes 124 adjacent to the horizontal center axis in the column direction may be selectively disposed on the left and right sides, respectively.

It is to be noted that when the positions of the connection ends of the third sub-touch-electrodes or the fourth sub-touch-electrodes are considered separately, the first connection ends 101 of T0 and T1 and the first connection ends 101 of T6 and T7 can be freely disposed on the upper side and the lower side, and the second connection ends 102 of R0 and R1 and the second connection ends 102 of R6 and R7 can be freely disposed on the left and right sides. However, when considering the touch panel as a whole, the connection ends of the third sub-touch-electrodes 113 and the connection ends of the fourth sub-touch-electrodes 124 are mutually limited. As described above, on the basis that the connection ends of R0 and R1 are disposed on the left side and the connection ends of R6 and R7 are disposed on the right side, the connection ends of T0 and T1 need to be disposed on the lower side, and the connection ends of T6 and T7 need to be disposed on the upper side. In some embodiments, on the basis that the connection ends of R0 and R1 are disposed on the right side and the connection ends of R6 and R7 are disposed on the left side, the connection ends of T0 and T1 need to be disposed on the upper side, and the connection ends of T6 and T7 need to be disposed on the lower side. Such arrangements are mainly due to that the third sub-touch-electrodes do not intersect all the second touch-electrodes, and that the fourth sub-touch-electrodes do not intersect all the first touch-electrodes. The fourth sub-touch-electrodes (R0 and R1) do not intersect with the third sub-touch-electrodes of T0, T1, T6 and T7, and when the connection ends of R0 and R1 located at the upper side in the column direction is disposed on the left side, the connection ends of R0 and R1 occupies an edge region on the upper-left side of the touch region 100. For T0 and T1 located at the left side in the row direction, only the connection ends of T0 and T1 can be disposed on the lower side, that is, the connection ends can be disposed on an edge region on the lower-left side of the touch region 100. In this case, the connection ends of R0 and R1 and the connection ends of T0 and T1 will not both occupy the upper left region of the touch region 100, and the wiring conflict between the wires corresponding to R0 and R1 and the wires corresponding to T0 and T1 in the bezel region can be avoided, so that only one same middle wire can be arranged in a same region, which makes the wiring simpler.

Figure 5:
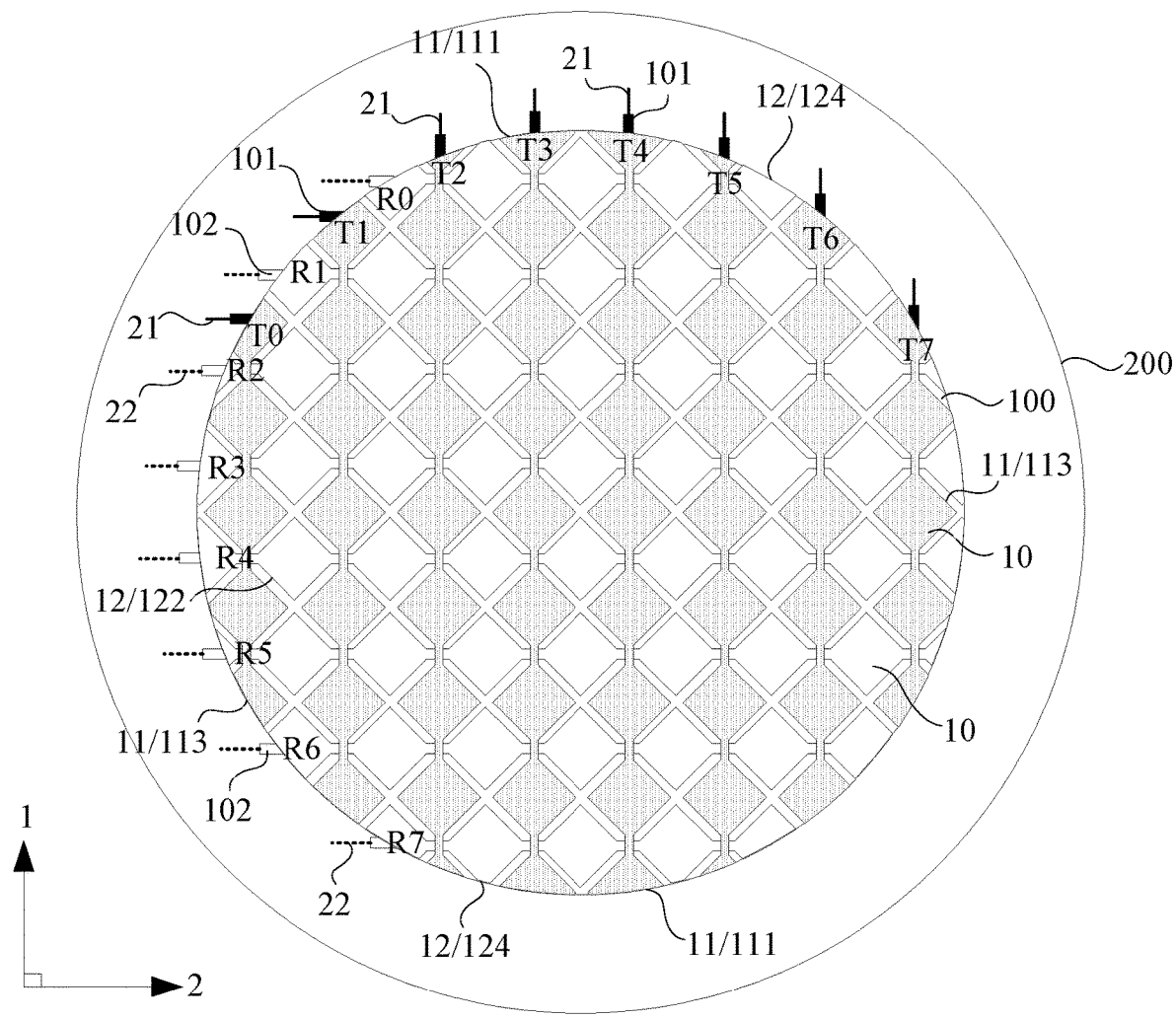
FIG. 5 is another structure diagram of a touch panel according to an embodiment of the present disclosure.

FIG. 5 is another structure diagram of a touch panel according to an embodiment of the present disclosure. Referring to FIG. 5, in another embodiment of the present disclosure, in some embodiments, at least part of the first touch-electrodes 11 that do not intersect with at least one of the second touch-electrodes 12 are third sub-touch-electrodes 113, at least part of the second touch-electrodes 12 that do not intersect with at least one of the first touch-electrodes 11 are fourth sub-touch-electrodes 124. First connection ends 101 of third sub-touch-electrodes 113 adjacent to the center axis of the touch region 100 in the second direction 2 are located at the same side of the touch region 100 in the first direction 1. Second connection ends 102 of fourth sub-touch-electrodes 124 adjacent to the center axis of the touch region 100 in the first direction 1 are located at the same side of the touch region 100 in the second direction 2.

In this embodiment, as shown in FIG. 5, the first touch-electrodes 11, i.e., the third sub-touch-electrodes 113 that do not intersect with at least one of the second touch-electrodes 12, includes T0, T1, T6 and T7, where T0 and T1, and T6 and T7 are respectively located at two sides of the longitudinal central axis in the row direction. The first connection ends 101 of four third sub-touch-electrodes 113 are disposed on the same side (the upper side) to prevent the first connection ends 101 corresponding to the third sub-touch-electrodes 113 at different positions from being distributed on the upper side and the lower side. It can be understood that the first wires 21 corresponding to the third sub-touch-electrodes 113 of which the connection ends are located at the same side have a small difference in the winding distance in the bezel region 200, that is, the length difference among the first wires 21 corresponding to the third sub-touch-electrodes 113 can be greatly avoided, thereby avoiding a large impedance difference among the first wires 21 corresponding to various first touch-electrodes 11, thus preventing static electricity from discharging on fixed wires, and avoiding the fixed wires from being injured by static electricity, which also ameliorates the problem of poor touch of the touch panel and improves the anti-static-electricity capability of the whole touch panel. Similarly, for the second touch-electrodes extending in the horizontal direction, the second touch-electrodes 12, i.e., the fourth sub-touch-electrodes 124 that do not intersect with at least one of the first touch-electrodes 11, includes R0, R1, R6 and R7, where R0 and R1, and R6 and R7 are respectively located at two sides of the horizontal center axis in the column direction. The second connection ends 102 of four fourth sub-touch-electrodes 124 are disposed on the same side (the left side) to prevent the second connection ends 102 corresponding to the fourth sub-touch-electrodes 124 at different positions from being distributed on the left and right sides, so that the length differences among the second wires 22 corresponding to the fourth sub-touch-electrodes 124 disposed on the same side are not too large, and the impedance difference among various second wires 22 can also be avoided, which is helpful to improve the anti-static-electricity capability of the whole touch panel.

Referring to FIG. 5, further, in an optional embodiment of the present disclosure, at least one first connection end 101 is adjacent to at least one second connection end 102, a first wire 21 and a second wire 22, respectively corresponding to and being electrically connected to a first connection end 101 and a second connection end 102 which are adjacent to each other extend in parallel.

As shown in FIG. 5, the first connection ends 101 of the third sub-touch-electrodes 113 are all disposed on the same side of the touch region 100 in the first direction 1, and also, the second connection ends 102 of the fourth sub-touch-electrodes 124 are all located at the same side of the touch region 100 in the second direction 2, so that both part of the connection ends of the first touch-electrodes 11 and part of the connection ends of the second touch-electrodes 12 are located at the same region of an edge of the touch region 100, for example, both the connection ends of R0 and R1 and the connection ends of T0 and T1 occupy the upper left region of the touch region 100. Considering that the extension directions of the first touch-electrodes 11 and the extension directions of the second touch-electrodes 12 are different, the extension directions of the first wires 21 connected to the first touch-electrodes 11 and the extension directions of the second wires 22 connected to the and the second touch-electrodes 12 are also different. However, in this embodiment, a first wire 21 and a second wire 22, respectively corresponding to and being electrically connected to a first connection end 101 and a second connection end 102 which are adjacent to each other extend in parallel, so that the problem of wiring clutter in the bezel region can be avoided, and the conflict for the wires corresponding to R0 and R1, and the wires corresponding to T0 and T1 in the bezel region 200 can be prevented on the wiring. As shown in FIG. 5, R0 and R1 correspond to two first wires 21, T0 and T1 correspond to two second wires 22, and two first wires 21 and two second wires 22 are extended in parallel and arranged alternately. In practical application, the widths and line spacing between a first wire 21 and a second wire 22 which are adjacent to each other can be designed to avoid signal interference between the first wire 21 and the second wire 22. In addition, it is to be noted that since the first wires 21 and the second wires 22 are alternately arranged, rather than merely the first wires or the second wires are arranged in a same region, and since the wires need to be extended and aggregated to the access region (not shown in the figure), to connect to pins of a touch driving chip through a bonding pad and a flexible circuit board which are bound to the access region, it is necessary to provide touch driving signals or touch sensing signals to the first wires and the second wires respectively based on the touch signals required by the first touch-electrodes and the second touch-electrodes, that is, it is necessary to design the pins of the touch driving chip to match the arrangement of the first wires and the second wires on the touch panel, which is not limited herein.

Figure 6:
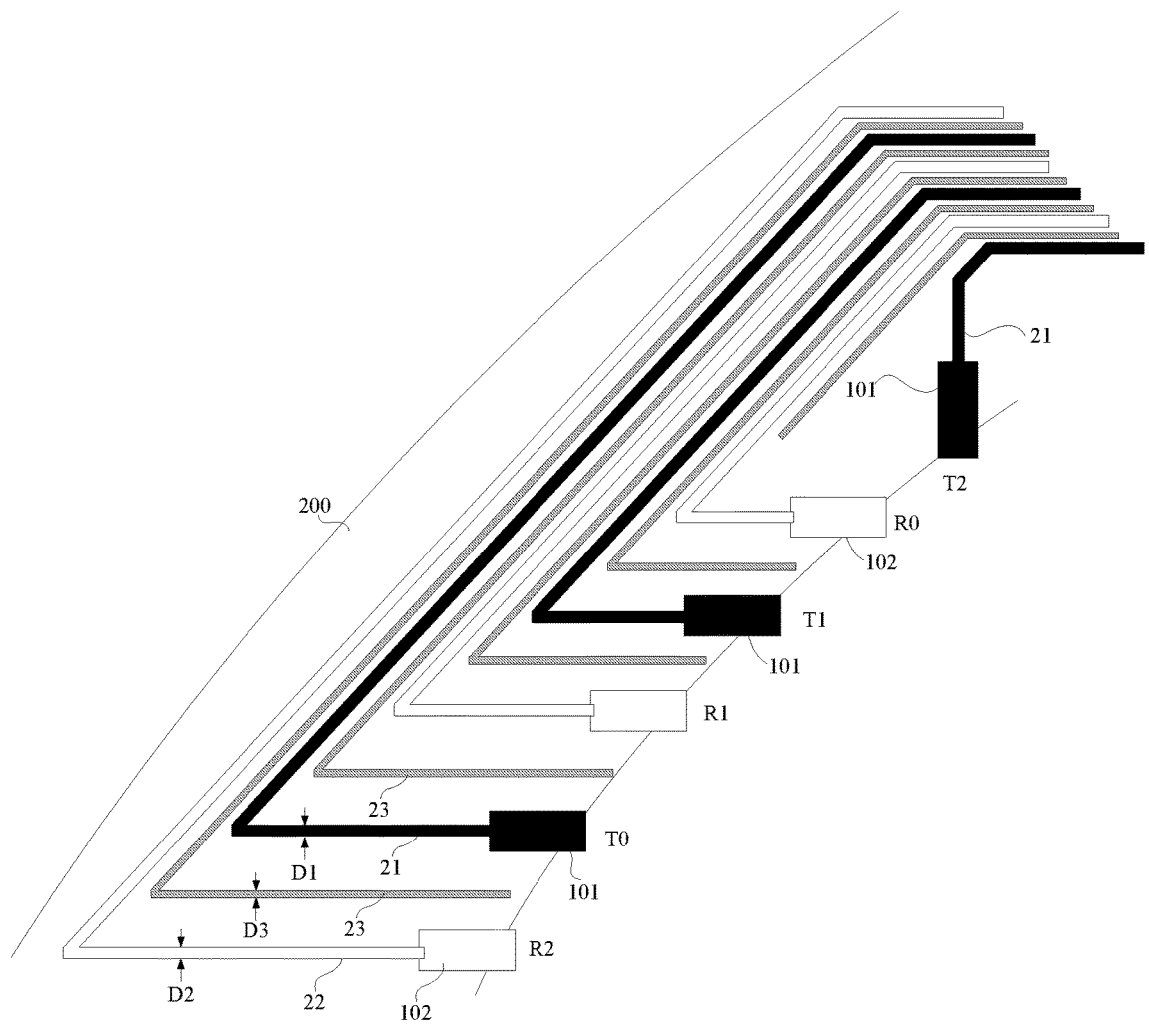
FIG. 6 is a partial structure diagram of a touch panel according to an embodiment of the present disclosure.

FIG. 6 is a partial structure diagram of a touch panel according to an embodiment of the present disclosure. Referring to FIG. 6, the difference from FIG. 5 lies in that the bezel region 200 further includes at least one signal shielding wire 23, and a signal shielding wire 23 is located between a first wire corresponding to and electrically connected to a first connection end 101 and a second wire 22 corresponding to and electrically connected to a second connection end 102, where the first connection end 101 and the second connection end 102 are adjacent to each other.

Herein, the signal shielding wire 23 is essentially a wire with a fixed potential, which can be connected to a fixed potential, i.e., receive a fixed potential signal. The signal shielding wire 23 is mainly used to separate the first wire 21 and the second wire 22 which are adjacent to each other, to avoid interference between different touch signals transmitted on the first wire 21 and the second wire 22, thereby playing a role of signal shielding. In some embodiments, the signal shielding wire 23, the first wire 21 and the second wire 22 may be made of a same material, and may be prepared in a same process, to avoid increasing the process flow and save the cost. In some embodiments, in order to improving the signal shielding performance, the signal shielding wire 23, the first wire 21 and the second wire 22 may be made of different materials, and may be prepared in different processes, which is not limited herein.

Referring to FIG. 6, in some embodiments, the width D3 of the signal shielding wire 23 is less than the width D1 of the first wire 21 and the width D2 of the second wire 22. The width of a wire is the width of the wire in the direction perpendicular to its extension direction, and the width of the wire affects the impedance performance of the wire to a certain extent. It can be understood that on the one hand, the first wires 21 and the second wires 22 need to transmit touch signals, and the impedance of the first wires 21 and the second wires 22 affects the voltage drop of touch signals on the first wires 21 and the second wires 22; and, on the other hand, the width of a wire will also affect the width of the bezel region, which will affect the design of narrow bezel products. Therefore, for the three types of wires, the width of the signal shielding wire 23 is set to be narrower than that of a first wire 21 and to be narrower than that of a second wire 22, so that it can avoid that the voltage drop of the touch signals is increased due to a narrow width of the first wire 21 and/or a narrow width of the second wire 22, and can prevent the problem of poor touch signal sensing. In addition, it can also avoid too many bezel regions to a certain extent, which is beneficial to achieve the narrow bezel design and increase the screen-to-body ratio.

Figure 7:
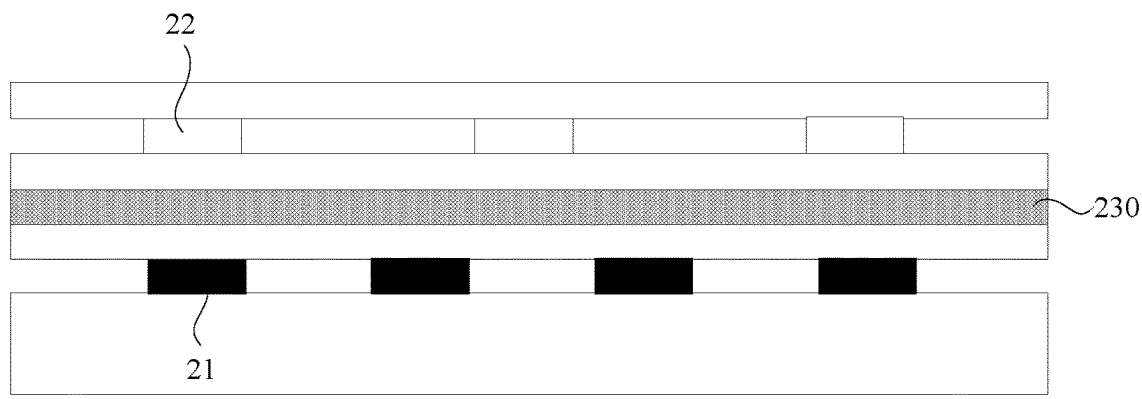
FIG. 7 is a sectional diagram of a touch panel according to an embodiment of the present disclosure.

FIG. 7 is a sectional diagram of a touch panel according to an embodiment of the present disclosure. Referring to FIG. 7, in another embodiment of the present disclosure, the first wires 21 and the second wires 22 are located at different film layers in the direction perpendicular to a plane where the touch panel is located. A signal shielding layer 230 is disposed between a film layer where the first wires 21 are located and a film layer where the second wires 22 are located, and the signal shielding layer 230 is insulated from the first wires 21 and the second wires 22, respectively.

First, referring to FIG. 5, part of the connection ends of the first touch-electrodes 11 and part of the connection ends of the second touch-electrodes 12 are both located at the same region at the edge of the touch region 100, for example, the connection ends of R0 and R1 and the connection ends of T0 and T1 are both located at the upper left side region of the touch region 100, which will lead to the signal interference between the first wires 21 and the second wires 22 to a certain extent. Besides, due to that the first wires 21 and the second wires 22 extend in parallel, a total width occupied by the wires in this upper left side region will be too wide, which will affect the narrow bezel design. In the embodiment shown in FIG. 7, the first wires 21 and the second wires 22 are not located in the same film layer. When the first wires 21 and the second wires 22 are respectively extended to the access region from the first connection ends 101 and the second connection ends 102, the first wires 21 and the second wires 22 can be freely extended in respective film layers where the first wires 21 and the second wires 22 are respectively located without being restricted by each other, so that the total width of the wires arranged in this region can be reduced, which is helpful for the narrow bezel design. In addition, by that the signal shielding layer 230 is provided between the film layer where the first wires 21 are located and the film layer where the second wires are located, and the signal interference therebetween can also be shielded. It is to be noted that the signal shielding layer 230 herein may be a metal layer which is connected to a fixed potential to achieve signal shielding. In some embodiments, the signal shielding layer 230 may also be an insulation layer with a relatively large thickness, and the signal shielding between the two film layers where the first wires 21 and the second wires 22 are respectively located can be achieved by the relatively large thickness of the signal shielding layer 230, which is not limited herein.

As described in the above embodiments, taking the third sub-touch-electrodes as an example, since the third sub-touch-electrodes do not intersect with at least one of the second touch-electrodes, the first connection ends of the third sub-touch-electrodes are not disposed in the same edge region of the touch region as the second connection ends, avoiding that the first connection ends of the third sub-touch-electrodes are limited by the second connection ends. For the first sub-touch-electrodes, since the first sub-touch-electrodes intersect with all the second touch-electrodes, the first connection ends of the first sub-touch-electrodes can be freely disposed on the upper side or the lower side, that is, the first connection ends of the first sub-touch-electrodes can be freely turned up and down. For example, the connection ends of T3 and T4 are disposed on the upper side as shown in FIG. 2, and the connection ends of T3 and T4 can also be disposed on the lower side, which can avoid the problem that there is a maximum length difference between the first wires caused by the connection ends of T3 and T4 being located at different sides, that is, the maximum impedance difference between the first wires can be avoided, and the anti-static-electricity capability of the whole touch panel can be improved. The same arrangements can be applied for the second touch-electrodes, which will not be described herein.

In practical applications, besides taking the static electricity into account, the transmission performance of the touch signals on the wires should also be considered. It can be understood that the greater the impedance on the wires, the greater the voltage drop of the touch signals transmitted on the wires, which will affect the accuracy of the touch signals and affect the touch performance. Therefore, when the connection ends are arranged, not only the maximum impedance difference among various wires should be considered, but also the influence of the positions of the connection ends on the impedance value of the wires themselves should be considered.

Figure 8:
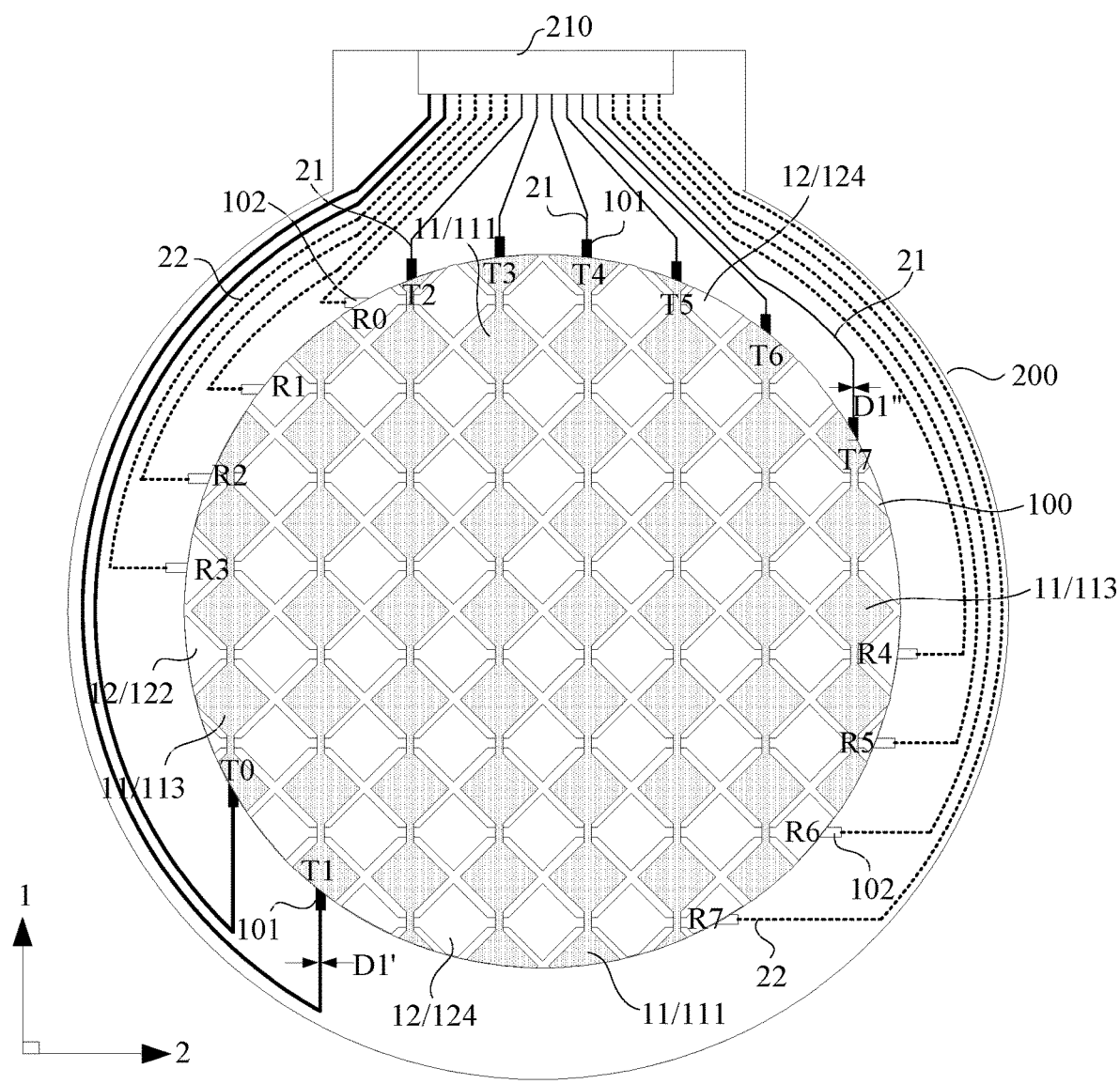
FIG. 8 is another structure diagram of a touch panel according to an embodiment of the present disclosure.

FIG. 8 is another structure diagram of a touch panel according to an embodiment of the present disclosure. Referring to FIG. 8, in some embodiments, the bezel region 200 includes an access region 210, where the access region 210 is located at a first side of the touch region 100 in the first direction 1. First connection ends 100 of at least two adjacent first sub-touch-electrodes 111 located at the central position of the touch region 100 in the second direction 2 are located at the first side of the touch region 100 in the first direction 1.

In this case, taking the first side in the first direction 1 being the upper side as an example, the access region 210 is disposed on the upper side of the touch region 100, correspondingly, first connection ends 101 of two adjacent first sub-touch-electrodes 111 in the central position, i.e., two adjacent first touch-electrodes 11 with the longest length in this embodiment, are also disposed on a side where the access region 210 is located, therefore, the distance between each of the first connection ends 101 and the access region 210 is shorter, and the extension lengths of first wires 21 are relatively short, so that it can avoid that the impedances of the first wires 21 of the first touch-electrodes 11 in the access region 210 being too large, thus ensuring that the first touch-electrodes 11 in the access region 210 can receive or feedback touch signals more accurately, and ensuring touch performance. In other words, in the embodiment of the present disclosure, the first connection ends 101 of two adjacent first sub-touch-electrodes 111 in the central position and in the second direction 2 are preferably disposed on the side where the access region 210 is located, i.e., the side closer to the access region 210. In this case, except that the anti-static difference among the wires corresponding to two first sub-touch-electrodes 111 can be reduced and anti-static-electricity capability can be improved as described above, the access region disposed in the bezel region is mainly used for disposing pads to connect the wires. The connection ends of the two first sub-touch-electrodes 111 are disposed close to the access region 210, so that the wires can be directly connected to the pads, thereby avoiding that the wires extend to other positions in the bezel region, saving an area of the bezel region and being beneficial to the design of the narrow bezel to a certain extent.

It is to be noted that in this embodiment, the access region 210 is disposed on the upper side, for the second touch-electrodes 12 extending in the horizontal direction, the connection ends connected the second touch-electrodes 12 and the second wires 22 are arranged on the left side or the right side, the lengths of the second wires 22 would not be affected a lot, that is, the influence on the impedance of the second wires 22 is small. Therefore, in this embodiment, the positions of the second connection ends 102 are not limited. As shown in FIG. 8, the second connection ends 102 may be partly disposed on the left side and partly disposed on the right side, to ensure that the number of wires in the left side of the bezel region is more or less as the number of wires in the right side of the bezel region to ensure the left side and the right side of the bezel region are uniform. The arrangement of the second connection ends 102 shown in FIG. 8 is only an example, and the arrangement of the second connection ends 102 is more flexible, which may be designed freely according to actual requirements, and is not limited herein.

It also to be noted that in other embodiments of the present disclosure, the access region can also be disposed on the first side of the touch region in the second direction, such as on the left side, the second connection ends of at least two adjacent second sub-touch-electrodes, i.e., two adjacent second touch-electrodes with the longest length, located at the central position of the touch region in the first direction can also be disposed on the first side, i.e., on the left side, of the touch region in the second direction. In this case, the second connection ends of the two second touch-electrodes are closer to the access region, and an extension length of the second wires are shorter, thus ensuring that the two second touch-electrodes can more accurately feedback or receive the touch signals and ensuring the touch performance. For the first touch-electrodes, since the first touch-electrodes extend in the longitudinal direction, the first connection ends are disposed on the upper side or the lower side, the lengths of the first wires connected the first connection ends would not be affected a lot, so that the first connection ends can be arranged freely, which is also not limited herein.

Referring to FIG. 8, in some embodiments, a width D1' of a first wire 21 corresponding to a first sub-touch-electrode 111 of which the first connection end 101 is located at the second side of the touch region 100 in the first direction 1 is greater than a width D1" of a first wire 21 corresponding to a first sub-touch-electrode 111 of which the first connection end 101 is located at the first side of the touch region 100 in the first direction 1.

The access region 210 is disposed on the first side i.e., the upper side, in the first direction 1, and the first connection ends 101 of the first sub-touch-electrodes 111 in the middle are also disposed on the upper side, the first wires 21 connected to the first sub-touch-electrodes 111 of which the first connection ends 101 are located at the upper side of the bezel region 200 are not only shorter in extension length, but also relatively larger in quantity. The number of the first sub-touch-electrodes 111 of which the first connection ends 101 are located at the lower side bezel region 200 is less, and an extension length of a first wire 21 connected to a first sub-touch-electrode 111 is relatively long. In this embodiment, the width D1' of the first wire of at least part of the first wires 21 corresponding to the first sub-touch-electrodes 111 of which the connection ends are located at the second side in the first direction 1 is greater than the width D1" of the first wire 21 of the first wires 21 corresponding to the first connection ends 101 on the first side in the first direction 1, that is, in the first wires 21 corresponding to the first sub-touch-electrodes 111, a width of a first wire 21 led out from the same side of the access region 210 is relatively narrower, while a width of a first wire 21 led out from the opposite side of the access region 210 is relatively wider. On one hand, first wires 21 with a larger number on the upper side are narrower in width, which is beneficial to reduce the width of the upper side of the bezel region; on the other hand, first wires 21 with a longer extension length on the lower side are wider in width, which is beneficial to reduce the impedance of the first wires led from the lower side and reduce the influence of the first wires 21 on the touch signals. Generally, a width of a first wire led out from the upper side of the bezel region in the first wires corresponding to the first sub-touch-electrodes is reduced, or a width of a first wire led out from the lower side of the bezel region is increased, so that the impedance difference among the first wires can be further balanced, the fixed electrostatic discharge path caused by the excessive impedance difference among the first wires is avoided, and also, the width of the upper side and the lower side of the bezel region is balanced, which is helpful to the design of the narrow bezel to a certain extent.

In other embodiments of the present disclosure, when the bezel region includes the access region, the access region is located at the first side of the touch region in the first direction, and in some embodiments, the width of a first wire of at least part of the first wires corresponding to the first connection ends located at the second side of the touch region in the first direction is greater than the width of a first wire of the first wires corresponding to the first connection ends located at the first side of the touch region in the first direction.

In the embodiment shown in FIG. 8, for the touch panel of which the position of access region has been determined, on the basis of not distinguishing which first touch-electrodes are connected to first wires, the widths of part or all of the first wires (examples in the figure include the first wires corresponding to T0 and T1) led out from the lower side which are selected are set to be relatively wider (represented by thick solid lines), and the widths of all or part of the first wires (examples in the figure includes the first wires corresponding to T2 to T7) led out from the upper side are set to be relatively narrower (represented by thin solid lines), to avoid excessive impedance of the first wires which are led out from the lower side and have a long extension length, and avoid the impedance of the first wires which are led out from the upper side and have a short extension length from being too small, thereby balancing the impedance difference among the first wires, further achieving the purpose of preventing static electricity from taking a fixed wire as a discharge path, avoiding the fixed wire from being injured by static electricity, ameliorating the poor touch problem of the touch panel and improving the anti-static-electricity capability of the whole touch panel.

Figure 9:
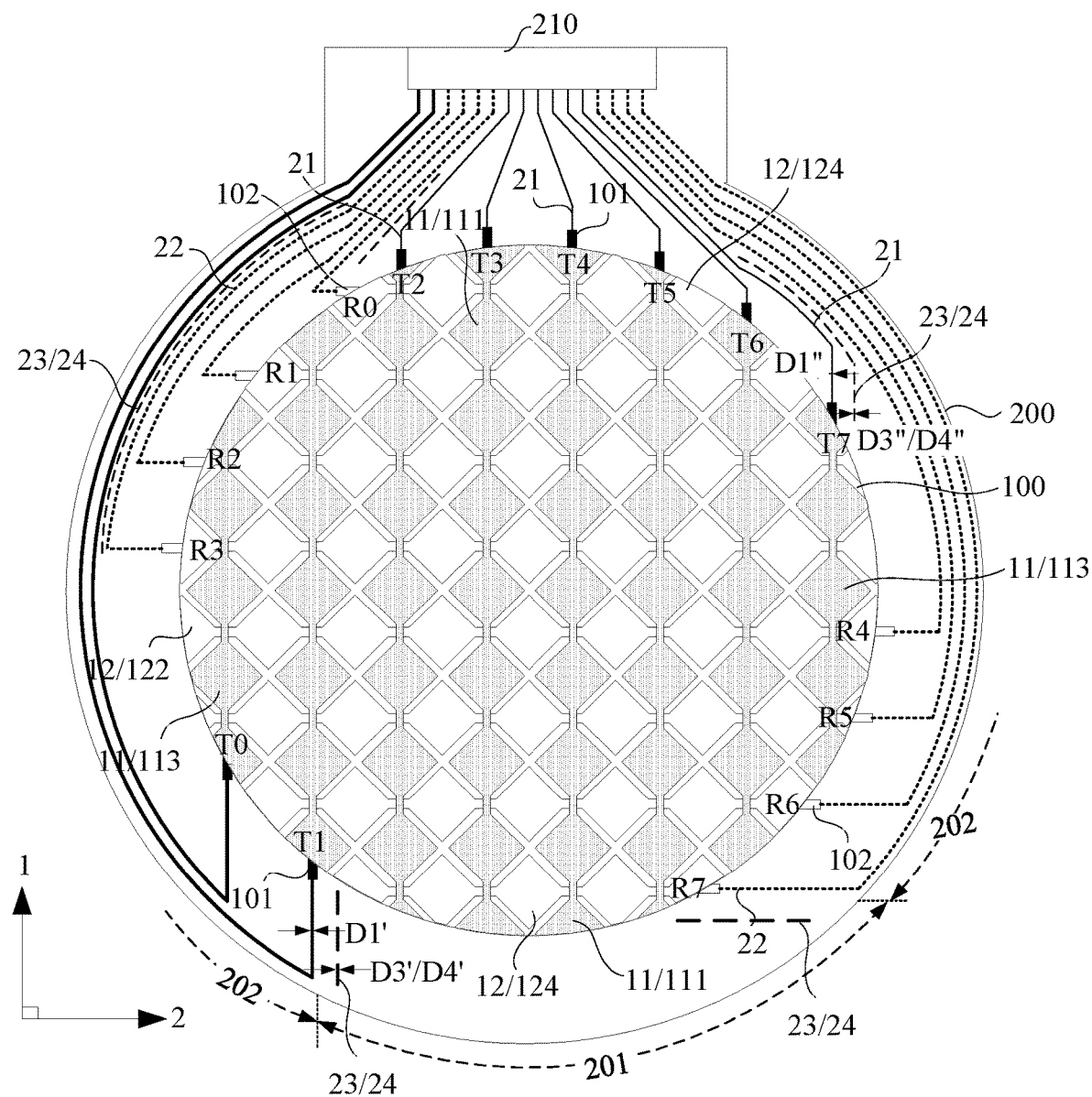
FIG. 9 is another structure diagram of a touch panel according to an embodiment of the present disclosure.

FIG. 9 is another structure diagram of a touch panel according to an embodiment of the present disclosure. Referring to FIG. 9, in another embodiment of the present disclosure, at least one first connection end 101 is adjacent to at least one second connection end 102, the bezel region 200 further includes at least one signal shielding wire 23 and/or at least one ground wire 24 (a same wire in figure represents a signal shielding wire 23 and a ground wire 24), and the signal shielding wire 23 and/or the ground wire 24 is located between a first wire 21 corresponding to a first connection end 101 and a second wire 22 corresponding to a second connection end 102, where the first connection end 101 is adjacent to the second connection end 102.

In some embodiments of the present disclosure, the signal shielding wire 23 and the ground wire 24 may be disposed in the bezel region 200, and disposed between the first wire 21 and the second wire 22 which are adjacent to each other. The function of the signal shielding wire 23 is to separate the first wire 21 and the second wire 22 which are adjacent to each other to avoid interference between different touch signals transmitted on the first wire 21 and the second wire 22. The ground wire 24 refers to a wire connected to the ground end. The ground wire 24 may be a wire connected to a circuit in the touch region 100 and is responsible for providing a ground signal to the circuit in the touch region 100. In some embodiments, the ground wire 24 may be a wire merely for providing a discharge path to discharge static electricity, and static electricity that may be exist in the panel can be discharged to the ground end through the ground wire 24.

Referring to FIG. 9, the bezel region 200 includes the access region 210, where the access region 210 is located at the first side of the touch region 100 in the first direction 1. A region between the first connection ends 101 and the second connection ends 102 which are adjacent to each other and located at the second side of the bezel region 200 in the first direction 1 is a first region 201, and the remaining region other than the first region in the bezel region 200 are a second region 202. In some embodiments, the width D3' of a signal shielding wire of at least part of the signal shielding wires 23 and/or the width D4 ' of a ground wire of located at the first region 201 are greater than the width D3' of a signal shielding line 23 and/or the width D4' of a ground wire 24 located at the second region 202.

The first region 201 essentially refers to a region in the first direction 1 on the side away from the access region 210 and in which the first connection ends 101 and the second connection ends 102 are not provided, i.e., a region where the first wires 21 and the second wires 22 are not provided, therefore, signal shielding wires 23 or the ground wires 24 can be arranged for the first region 201. It is to be noted that the positions and the connection relationships of the extended length of the signal shielding wires 23 or the ground wires 24 are only examples, which can be provided according to the requirements in practical applications, and is not limited herein. Because the area of the first region 201 is relatively large, the wires can be arranged in the first region 201. In this embodiment, the width of the signal shielding wire 23 or the width of the ground wire 24 in the first region 201 is disposed to be relatively wide, the impedance of the signal shielding wire 23 or the ground wire 24 can be reduced to a certain extent, and the signal shielding wire 23 or the ground wire 24 can play a positive role in replacing the first wires or the second wires as an electrostatic discharge path, to avoid the influence of static electricity on the touch function.

It is to be noted that although the signal shielding wire 23 or the ground wire 24 in the first region 201 and the signal shielding wire 23 or the ground wire 24 of the second regions 202 have a width difference, and may be the same one signal shielding wire 23 or ground wire 24, that is, the same wire extends in the first region 201 and the second region 202 at the same time, and presents different widths in the first region 201 and the second regions 202. Of course, the above-mentioned width difference design is equally applicable to the signal shielding wires 23 or the ground wires 24 provided independently of the two regions.

In embodiments of the present disclosure, at least the first connection ends of two adjacent first touch-electrodes located at the central region are disposed on the same side, in essence, two first wires which may have the largest impedance difference in the first wires connected to the first touch-electrodes are disposed on the same side to avoid the largest impedance difference among the first wires. On this basis, for other first wires which may have larger impedance, the other first wires can also be disposed on the same side, to minimize the impedance difference among the first wires. Therefore, related schemes are also provided in embodiments of the present disclosure for the selection of other first wires that may have a larger impedance and may be disposed on the same side, or for the selection of first wires that may be disposed on the other side with a relatively small impedance.

Referring to FIGS. 2 and 4, in some embodiments, a first connection end 101 of a first sub-touch-electrode 11 located at a most central position of the touch region 100 in the second direction 2 is located at a first side in the first direction 1; first wires, which are electrically connected to respective first sub-touch-electrodes 11 with first connection ends 101 located at a second side in the first direction 1, have a smallest resistance value R0; a first wire 21, which is electrically connected to a respective first sub-touch-electrode 11 located at a most central position of the touch region 100 in the second direction 2, has a resistance value R1; and one of the first wires 21, which are electrically connected to the respective first touch-electrodes 11 with the first connection ends 101 located at the second side in the first direction has a resistance value R2, wherein R0, R1 and R2 satisfy $|R2-R1|/|R0-R1|<7.8/5.8$, and $R0 \leq R2$; and/or, a second connection end 102 of a second sub-touch-electrode 12 located at a most central position of the touch region 100 in the first direction 1 is located at a first side in the second direction 2; second wires 22, which are electrically connected to respective second sub-touch-electrodes 12 with second connection ends 102 located at a second side in the second direction 2, have a smallest resistance value R0'; a second wire 22, which is electrically connected to a respective second sub-touch-electrode 12 located at a most central position of the touch region 100 in the first direction 1, has a resistance value R1'; and one of the second wires 22, which are electrically connected to the respective second touch-electrodes 12 with the second connection ends 102 located at the second side in the second direction 2 has a resistance value R2', wherein R0', R1' and R2' satisfies $|R2'-R1'|/|R0-R1'| \leq 7.8/5.8$, and $R0' \leq R2'$.

The first touch-electrode extending in the longitudinal extend will continue to be explained as an example. Firstly, the number of the first sub-touch-electrodes 111 located at the most central position of the touch region 100 in the second direction 2 depends on the number of first touch-electrodes 11. When the number of first touch-electrodes 11 is an odd, one first touch-electrode 11 is located at the most central position. As shown in FIG. 2, when the number of first touch-electrodes 11 is an even, two first sub-touch-electrodes 111 are located at the most central position, which are T3 and T4.

As shown in FIG. 2, the first connection ends 101 of the first sub-touch-electrodes 111 i.e., T3 and T4, on the most central position, are, for example, located at the upper side, and in this case, the first wires 21 corresponding to T3 and T4 are first wires 21 with the smallest resistance value R1 among all the first wires 21. In the first wires 21 corresponding to the first touch-electrodes 11 of which the first connection ends 101 are located at the lower side, there is also a first wire 21 with the smallest resistance value R0, which is illustrated as the first wire 21 corresponding to and connected to T0. It can be understood that in the first wires 21 corresponding to the first touch-electrodes 11 of which the connection ends 101 are located at the lower side, there is also a first wire 21 (such as T2) with the biggest resistance value, and T2 is a first wire 21 with the biggest resistance value in all the first wires 21. The resistance values of the first wires 21 corresponding to the first sub-touch-electrodes 111 of which the connection ends are located at the lower side, should have a certain upper limit, to ensure that the differences between the resistance values of the first wires 21 and the resistance value of T0 are within an acceptable anti-static-electricity range. In other words, a resistance difference between a first wire corresponding to T2 and a first wire corresponding to T0 should be within an acceptable anti-static-electricity range. In some embodiments, the resistance values R2 of the first wires 21 corresponding to the first touch-electrodes 11 of which the connection end is located at the lower side should satisfy the following relationships: $|R2-R1|/|R0-R1|<7.8/5.8$, and $R0 \leq R2$, to ensure that the resistance value of each first wire 21 is within the acceptable anti-static-electricity range, where the acceptable anti-static-electricity range represents the resistance difference range that can improve the anti-static-electricity capability of the whole touch panel. It can be understood that taking T2 as an example, when the resistance value of the wire of T2 leads to the resistance difference range (i.e. 7.8/5.8) is exceeded, it indicates that the resistance value of T2 is too large, and the difference between the resistance value of T2, and R1, i.e., the resistance value of the wires corresponding to T3 and T4, is too large, which easily leads to the discharge of static electricity in a fixed path, thus causing the problem of weakening the anti-static-electricity capability of the whole touch panel. Similarly, For the second touch-electrodes extending in the horizontal direction, the resistance value of the second wire corresponding to a respective second touch-electrode satisfies the same ratio condition, i.e., $|R2'-R1'|/|R0'-R1'| \leq 7.8/5.8$, and $R0' \leq R2'$, which will not be described herein.

Referring to FIG. 2, in the embodiment of the present disclosure, the first touch-electrode 11 and the second touch-electrode 12 each include multiple electrode blocks 10 sequentially connected in series, the multiple electrode blocks 10 in the first touch-electrode 11 and the multiple electrode blocks 10 in the second touch-electrodes 12 do not overlap, and a connection structure of the multiple electrode blocks 10 in the first touch-electrodes 11 and a connection structure of the multiple electrode blocks 10 in the second touch-electrodes 12 form a cross-bridge structure and are insulated from each other.

Further in some embodiments, the first touch-electrodes 11 and the second touch-electrodes 12 are located at the touch region 100, electrode blocks 10 of the first touch-electrodes 11 and the second touch-electrodes 12, which are located at the central region of the touch region 100, are central electrode blocks, electrode blocks 10 of the first touch-electrodes 11 and the second touch-electrodes 12, which are located at the edge region of the touch region 100, are edge electrode blocks. An edge electrode block has a shape same as part of an electrode block having a same shape as a central electrode block with an edge line. An area of an edge electrode block is greater than an area of a central electrode block by 20%, or equal to an area of a central electrode block.

In a practical process of preparation, the shape of the touch panel is usually formed by cutting, and for the shape of the entire touch region, it is necessary to be designed according to the shape of the touch panel. Therefore, it is necessary to cut and design the electrode blocks arranged in an array in the touch region to have a specific shape, which can ensure that the touch region has a shape similar to that of the entire touch panel. In a case where the entire electrode block array is cut and designed in a specific shape such as a circle, a touch region of this specific shape can be formed, however the shapes and the sizes of the electrode blocks in the edge region will be changed obviously when the special shape is moved horizontally or longitudinally over the entire electrode block array. In other words, the shapes and the sizes of the electrode blocks in the edge region are determined by the position of the special shape on the entire electrode block array. In the embodiments of the present disclosure, an area of an electrode block 10 located at the edge region of the touch region 100 (i.e., an edge electrode block) is restricted to be greater than an area of an electrode block 10 located at the central region of the touch region 100 (i.e., a central electrode block) by 20% or to be equal thereto, to indirectly restrict the position of the special shape on the entire electrode block array during the cutting process, so that it is ensured that the electrode blocks 10 in the edge region have a larger area. Because the electrode blocks in the edge region needs to be provided with connection ends to achieve the connection with the wires, connection surfaces are provided for the electrode blocks in the edge region which needs to be provided with the connection ends, to ensure a better electrical connection between the touch-electrodes and the wires and to avoid poor conduction therebetween.

Figure 10:
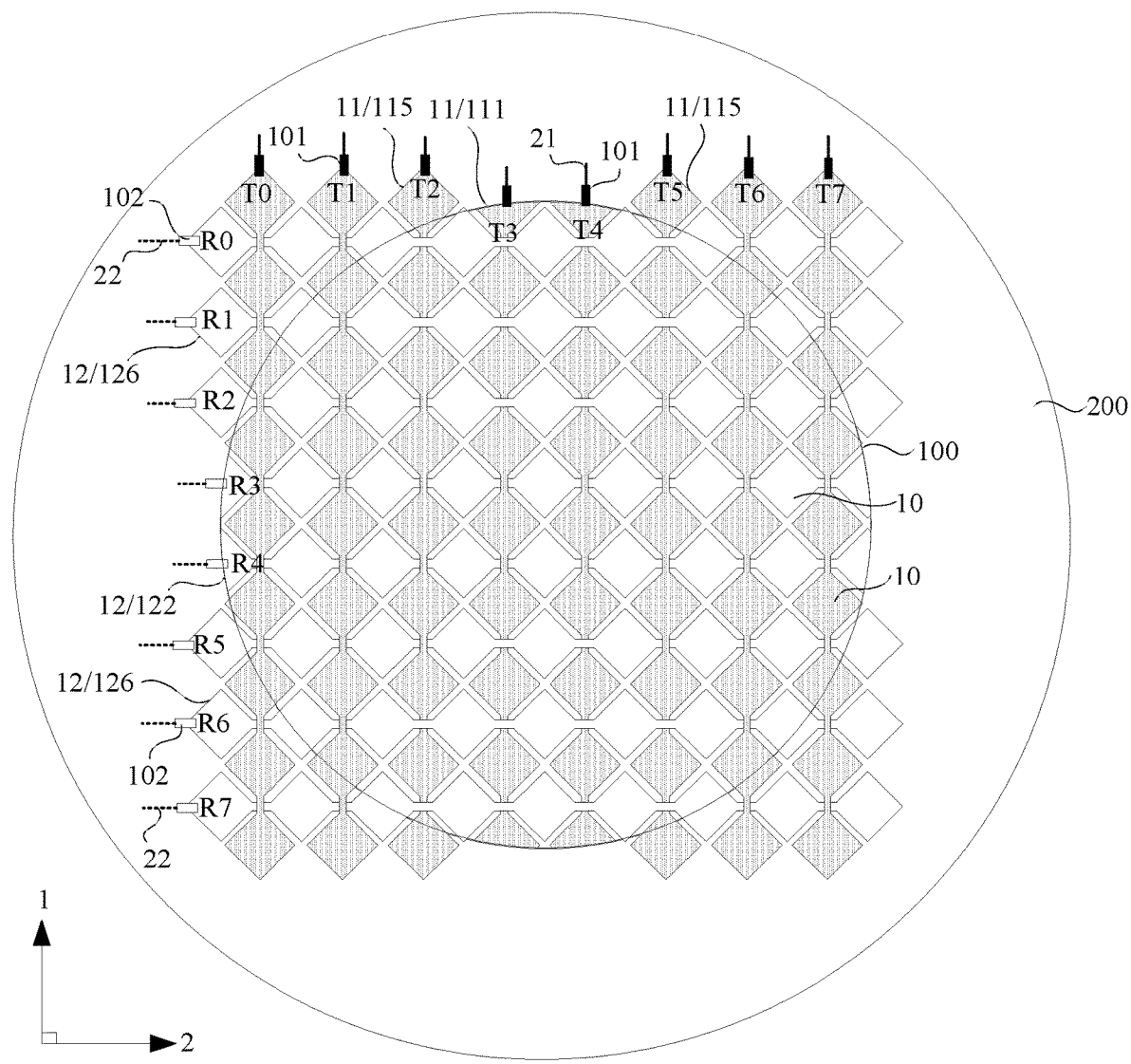
FIG. 10 is another structure diagram of a touch panel according to an embodiment of the present disclosure.

FIG. 10 is another structure diagram of a touch panel according to an embodiment of the present disclosure. Referring to FIG. 10, in some embodiments, at least part of first touch-electrodes 11, which are located at an edge position of the touch region 100 in the second direction 2 and are extended to the bezel region 200, are fifth sub-touch-electrodes 115. At least part of second touch-electrodes 12, which are located at an edge position of the touch region 100 in the first direction 1 and are extended to the bezel region 200, are sixth sub-touch-electrodes 126.

At least part of the fifth sub-touch-electrodes 115 intersect with all the second touch-electrodes 12, and first connection ends 101 of the at least part of fifth sub-touch-electrodes 115 intersecting with all the second touch-electrodes 12 and a first connection end 101 of a first sub-touch-electrode 111 located at a most central position of the touch region 100 in the second direction 2 are located at a same side of the touch region 100 in the first direction 1. At least part of sixth sub-touch-electrodes 126 intersect with all the first touch-electrodes 11, and second connection ends 102 of the at least part of sixth sub-touch-electrodes 126 intersecting with all the first touch-electrodes 11 and a second connection end 102 of a second sub-touch-electrode 122 located at a most central position of the touch region 100 in the first direction 1 are located at a same side of the touch region 100 in the second direction 2.

According to this embodiment, part of the touch-electrodes are extended to the bezel region 200, that is, the touch-electrodes are designed to be extended outward. Taking the first touch-electrodes 11 extending in the longitudinal direction as an example, part of the first touch-electrodes 11 near to the left edge and the right edge are disposed to extend into the bezel region 200, that is, electrode blocks are still disposed in the bezel region 200 and connected to the first touch-electrodes 11 in the touch region 100, whereby the fifth sub-touch-electrodes 115 are formed with increased lengths. Similarly, for the second touch-electrodes 12 extending in the horizontal direction, part of the touch-electrodes may be disposed to be extended to the bezel region 200, that is, part of the second touch-electrodes 12 near the upper and lower edge positions may be extended to the bezel region 200, whereby the sixth sub-touch-electrodes 126 are also formed with increased lengths. It can be understood that the electrode blocks are also disposed in the bezel region 200, so that the length of the first touch-electrodes 11 in the longitudinal direction and the length of the second touch-electrodes 12 in the horizontal direction are lengthened. By the lengthened part, first touch-electrodes 11 intersect with all the second touch-electrodes 12, and second touch-electrodes 12 intersect with all the first touch-electrodes 11. For the fifth sub-touch-electrodes 115, the connection ends of the fifth sub-touch-electrodes 115 may be disposed on the upper side or the lower side, and for the sixth sub-touch-electrodes 126, the connection ends of the sixth sub-touch-electrodes 126 may be disposed on the left side or the right side. Based on this, in this embodiment, the connection ends of the fifth sub-touch-electrodes 115 are further disposed on a side (the upper side) where the connection ends of the first sub-touch-electrodes 111 on the central position are located, so that an obvious length difference between a first wire corresponding to a respective fifth sub-touch-electrodes 115 and a first wire 21 corresponding to a respective first sub-touch-electrode 111 at the central position can be avoided, and the impedance differences therebetween can be reduced. Similarly, the connection ends of the sixth sub-touch-electrodes 126 are disposed on a side (the left side) where the connection ends of the second sub-touch-electrodes 122 on the central position are located, so that an obvious length difference between a second wire 22 corresponding to and connected to a respective sixth sub-touch-electrode 126 and a second wire 20 corresponding to and connected to a respective second sub-touch-electrode 122 on the central position can be avoided, and the impedance difference therebetween can be reduced, thus helping to improve the anti-static-electricity capability of the whole touch panel.

Figure 11:
FIG. 11 is a sectional diagram of a touch panel according to an embodiment of the present disclosure.

FIG. 11 is a sectional diagram of a touch panel according to an embodiment of the present disclosure. In an embodiment, at least in the bezel region, the electrode blocks 10 in each of the fifth sub-touch-electrodes 115 and the electrode blocks 10 in each of the sixth sub-touch-electrodes 126 are located at film layers different from the film layer where the first wires 21 are located and different from the film layer where the second wires 22 are located, in the direction perpendicular to the plane where the touch panel is located.

The fifth sub-touch-electrodes 115 and the sixth sub-touch-electrodes 126 serve as touch-electrodes extending to the bezel region and will occupy some area of the bezel region to a certain extent. The electrode blocks 10 of the fifth sub-touch-electrodes 115 located at the bezel region and the electrode blocks 10 of the sixth sub-touch-electrodes 126 located at the bezel region and the wires of the bezel region, i.e., the first wires 21 and the second wires 22, are disposed in different film layers, the electrode blocks and the wires can be designed freely in the film layers respectively without mutual restriction, which has a certain positive effect on reducing the area of the bezel region where the electrode blocks and the wires are located and is helpful to achieve the design of the narrow bezel.

Figure 12:
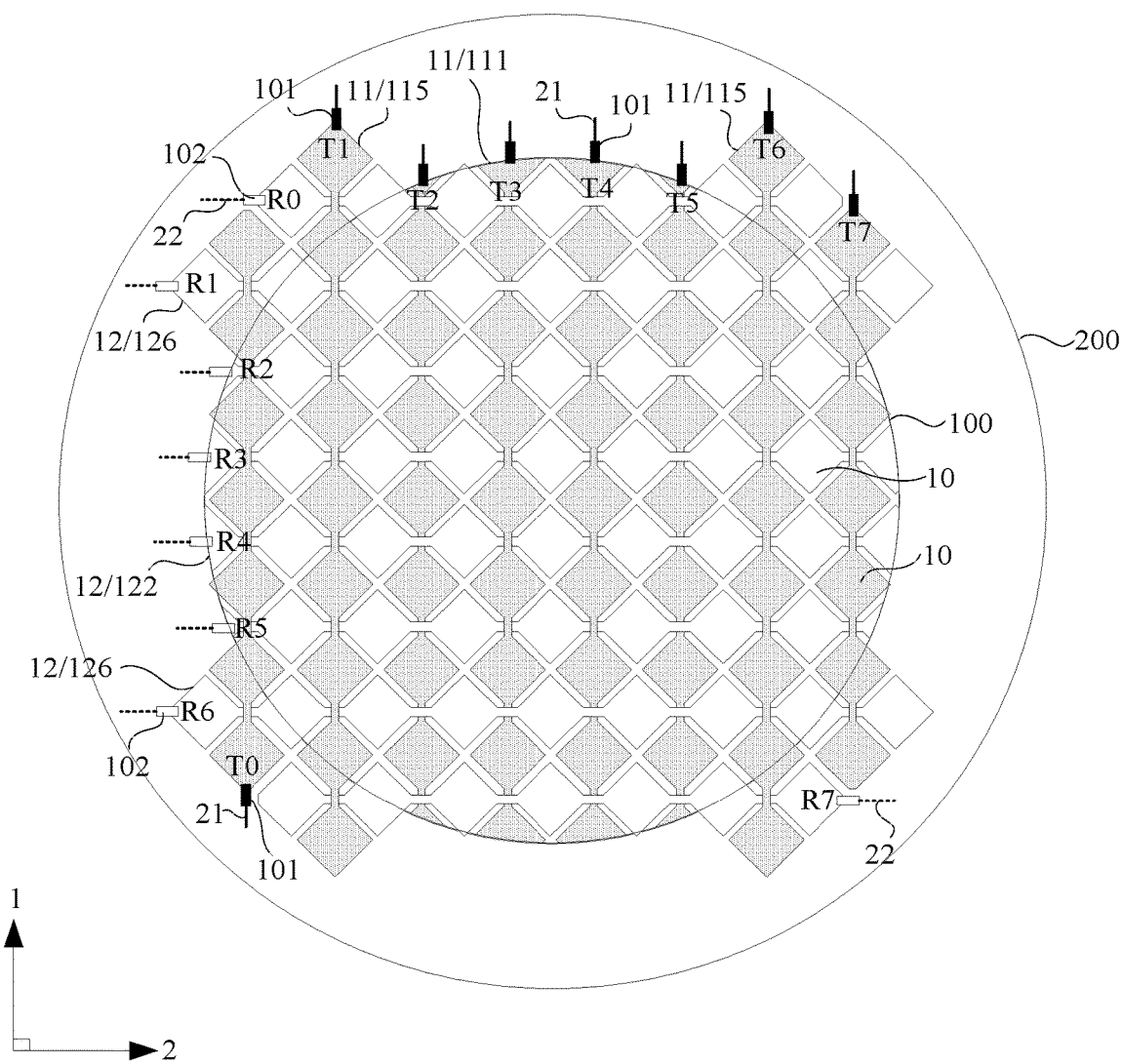
FIG. 12 is another structure diagram of a touch panel according to an embodiment of the present disclosure.

FIG. 12 is another structure diagram of a touch panel according to an embodiment of the present disclosure. Referring to FIG. 12, in a preferred embodiment, electrode blocks 10 in a head position and a tail position of the fifth sub-touch-electrodes 115 may be disposed to are extended to the bezel region 200, and/or electrode blocks 10 in a head position and a tail position of the sixth sub-touch-electrodes 126 may be disposed to are extended to the bezel region 200.

In this embodiment, the design for narrow bezel of the touch panel is also considered. Comparing with FIG. 10 and FIG. 12, it can be seen that for the extended first touch-electrodes and the extended second touch-electrodes, it is preferable that only one electrode block is added or supplemented at each of two end positions, that is, only the electrode block at the head position of the extended touch-electrode and the electrode block at the tail position of the extended touch-electrode are extended to the bezel region 200. In this case, based on a same principle as that for FIG. 10, the extended touch-electrodes can not only reduce the impedance difference among wires corresponding to the extended touch-electrodes, but also avoid an area of the bezel region of the touch panel to be enlarged too much due to the addition of electrode blocks, thus achieving both a design for anti-static-electricity and a design for narrow bezel for the touch panel.

Figure 13:
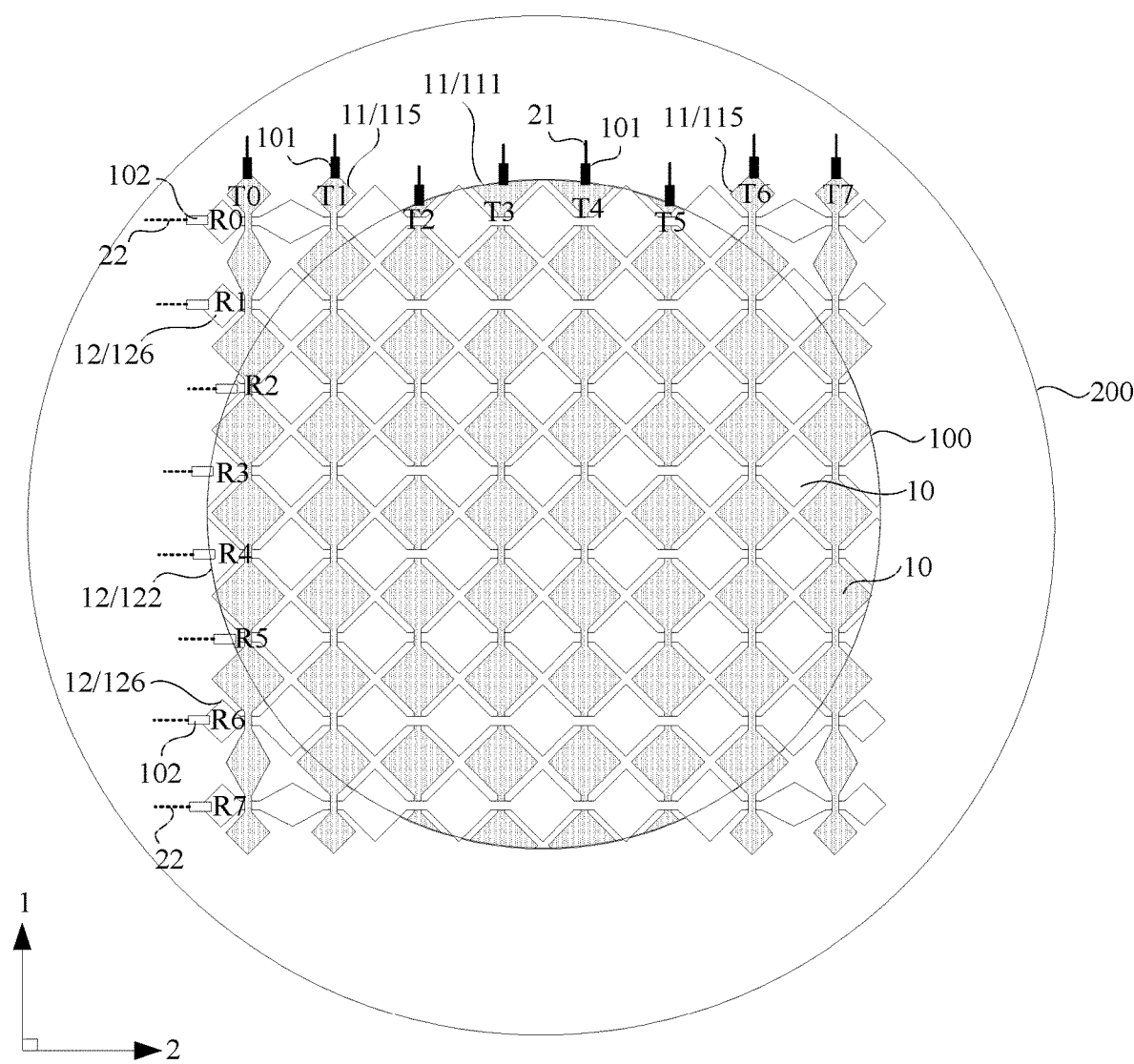
FIG. 13 is another structure diagram of a touch panel according to an embodiment of the present disclosure.

FIG. 13 is another structure diagram of a touch panel according to an embodiment of the present disclosure. Referring to FIG. 13, in another embodiment, in the fifth sub-touch-electrode 115 and/or the sixth sub-touch-electrode 126, an electrode block 10 located at the bezel region 200 may be provided with a smaller area than that of an electrode block 10 located at the touch region 100.

In this embodiment, the electrode blocks 10 extended to the bezel region 200 are mainly provided to make the touch-electrodes intersect to facilitate design the positions of the connection ends, rather than to be used for realizing touch function. Therefore, the electrode block 10 in the bezel region 200 can be provided to have a smaller area, so that the area of the bezel region 200 occupied by the electrode blocks 10 can be reduced directly, which is beneficial to the implementation of the narrow bezel design. The shape of and the size of the electrode blocks 10 in the bezel region 200 as shown in FIG. 13 are merely an example rather than limitation.

In the above embodiments, the touch-electrodes are extended to the bezel region, to make the touch-electrodes intersect with all the other-type touch-electrodes, so that the connection ends thereof are convenient to be disposed on a same side as connection ends of the touch-electrodes located at a central position, therefore, connection ends of the more touch-electrodes are disposed on the same side, and the impedance difference among the wires corresponding thereto is reduced. In addition to the above arrangements, the embodiments of the present disclosure also provide other arrangements to increase the number of connection ends thereof on the same side.

Figure 14:
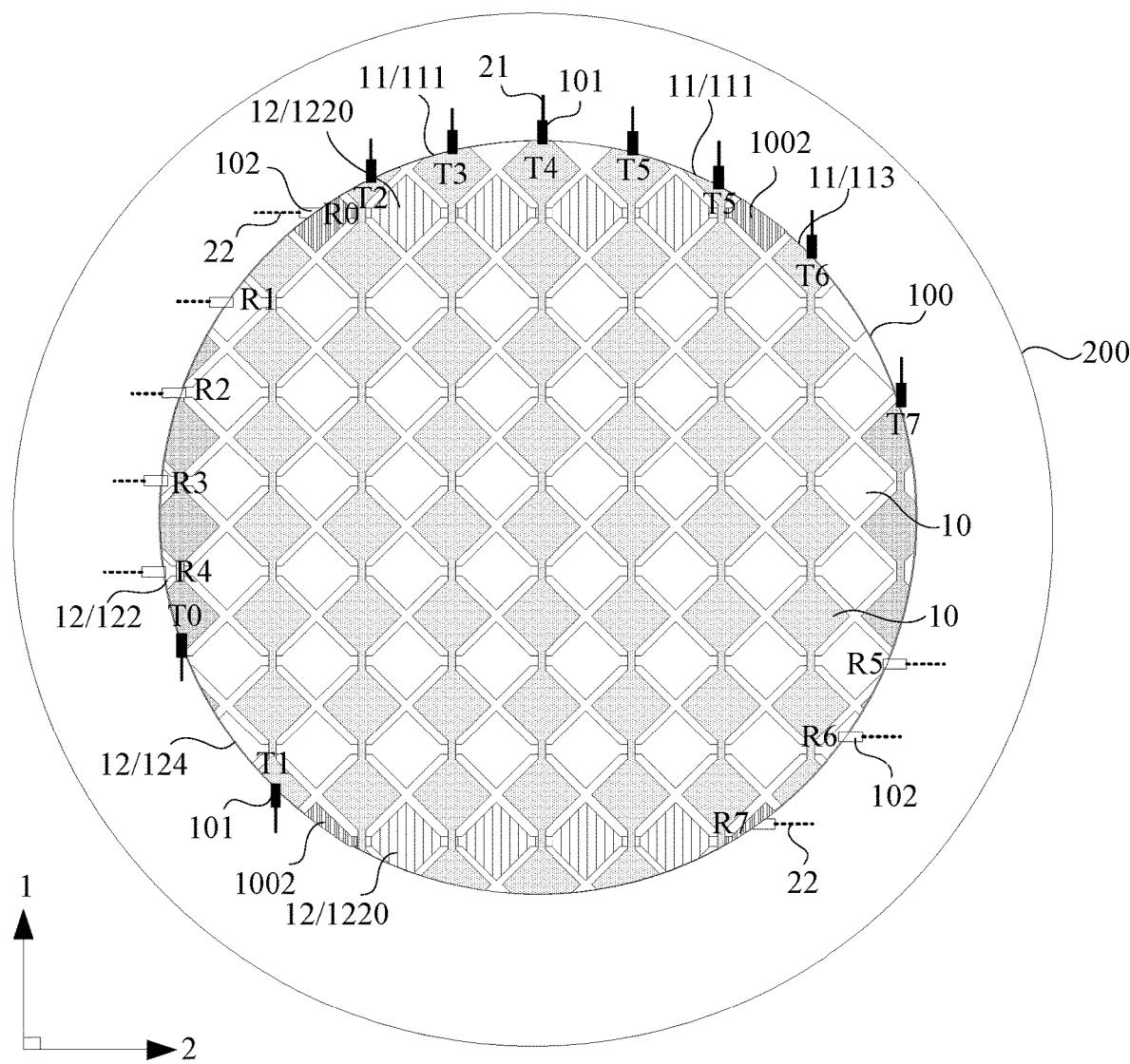
FIG. 14 is another structure diagram of a touch panel according to an embodiment of the present disclosure.

FIG. 14 is another structure diagram of a touch panel according to an embodiment of the present disclosure. Referring to FIG. 14, in some embodiments, in first touch-electrodes 11 located at the most edge in the second direction 2, each of electrode blocks 10 respectively located at the head position and the tail position has a shape same as part of an electrode block 10 having the same shape as an electrode block in the central region of the touch region 100, and the electrode blocks 10 respectively located at the head position and the tail position in the first touch-electrodes 11 located at the most edge in the second direction 2 is in an axisymmetric pattern, and a symmetry axis thereof is parallel to the second direction 2; and/or, in second touch-electrodes 12 located at the most edge in the first direction 1, each of electrode blocks 10 respectively located at a head position and a tail position has a shape same as part of an electrode block having the same shape as an electrode block 10 in the central region of the touch region 100, and the electrode blocks 10 respectively located at each of the head position and the tail position in the second touch-electrodes 12 located at the most edge in the first direction 1 is in an axisymmetric pattern, and a symmetry axis thereof is parallel to the first direction 1.

Taking the second touch-electrodes 12 extending in horizontal direction as an example, in the second touch-electrodes 12 at the most edge of the upper side or the lower side, electrode blocks 10 respectively disposed at the head position and the tail position of the second touch-electrodes 12 is in an axisymmetric pattern, and the symmetry axis thereof is parallel to the first direction 1, that is, the electrode blocks 10 at two ends of the second touch-electrodes 12 are axisymmetric relative to the longitudinal central axis. With this arrangement, more electrode blocks 10 are disposed in the second touch-electrodes 12 at the most edge of the upper side and the lower side without changing the shape and size of the touch region.

Figure 15:
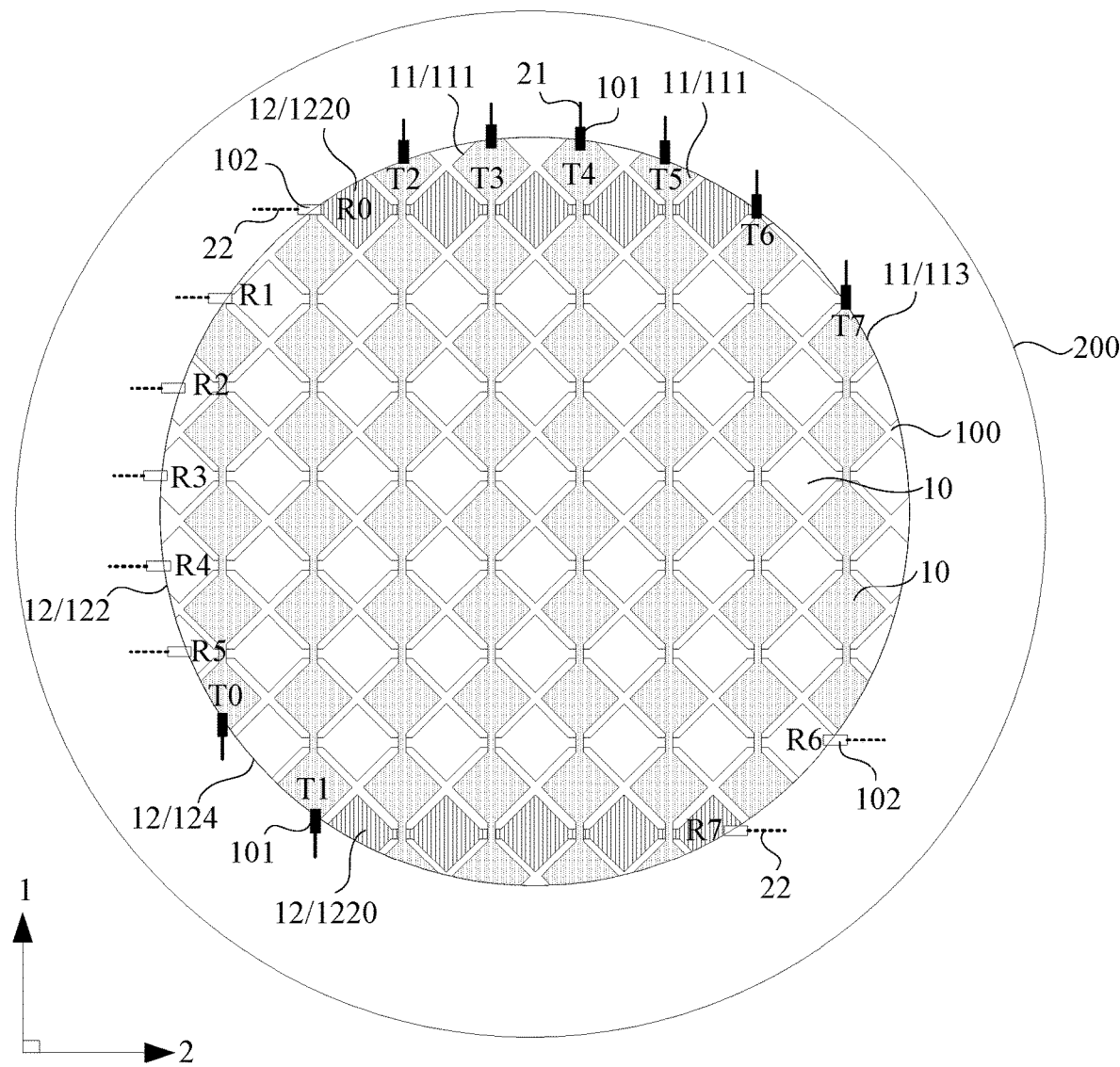
FIG. 15 is another structure diagram of a touch panel according to an embodiment of the present disclosure.

As mentioned in the above embodiments, when the cut shape is moved in the horizontal direction or the longitudinal direction relative to the entire electrode block array, the shapes and the sizes of the electrode blocks in the edge region are obviously changed, and the shapes and the sizes of the electrode blocks in the edge region are determined by the position of the shape of the touch panel relative to the entire electrode block array. Further, in some embodiments, the position of the cut shape relative to the entire electrode block array determines the number of first touch-electrodes, i.e., first sub-touch-electrodes, intersecting with all the second touch-electrodes and the number of second touch-electrodes, i.e., second sub-touch-electrodes, intersecting with all the first touch-electrodes. In some embodiments, FIG. 15 is another structure diagram of a touch panel according to an embodiment of the present disclosure. Compared FIG. 15 with FIG. 14, when a circular edge line of the touch region 100 shown in FIG. 15 is moved in horizontal direction from left to right relative to the touch-electrode array, the second touch-electrode 12 in the most upper side (illustrated as 1220 in the figure), the electrode block 10 at the left end (illustrated as 1002 in the figure) becomes smaller, and an additional electrode block 10 (illustrated as 1002 in the figure) at the right end is added and becomes bigger gradually until as shown in FIG. 14 that the electrode block 10 at the left end and the electrode block 10 at the right end are both formed by edge wire cutting and symmetrical. In this case, the number of electrode blocks 10 of the second touch-electrode 1220 at most edge on the upper side in FIG. 14 will be one more than that in FIG. 15. The number of electrode blocks in the second touch-electrodes 1220 at most edge in the upper side in FIG. 14 is 6, and the number of electrode blocks in the second touch-electrodes 1220 at most edge in the upper side in FIG. 15 is 5. Considering that the first touch-electrodes 11, i.e., the first sub-touch-electrodes 111, intersecting with all the second touch-electrodes 12 are first touch-electrodes 11 intersecting the second touch-electrodes 1220 at the most edge and on the upper side and the lower side, the first sub-touch-electrodes 111 intersects the second touch-electrode 1220 through a position between two adjacent electrode blocks in the second touch-electrodes 12 at the most edge. Based on this, the second touch-electrodes 1220 at the upper edge in the embodiment shown in FIG. 14 has a larger number of electrode blocks, there are more first sub-touch-electrodes 111 intersecting the second touch-electrodes 12 through positions between the electrode blocks. There are five first sub-touch-electrodes 111 in FIG. 14, and there are four first sub-touch-electrodes 111 in FIG. 15. Therefore, by the design of the electrode blocks, i.e., by adjusting the position of the cut shape relative to the entire electrode block array by moving left and right, the number of first sub-touch-electrodes 111 can be increased, thereby helping to dispose first connection ends 101 of more first touch-electrodes 11 on the same side, reducing the length differences among the first wires 21, and further reducing the impedance differences among various first wires 21. Similarly, for the number of second sub-touch-electrodes 122, when the position of the cut shape relative to the entire electrode block array is designed, it is necessary to adjust the position of the cut shape relative to the entire electrode block array by moving up and down, to ensure that most second sub-touch-electrodes 122 are formed, thereby helping to dispose second connection ends 102 of more second touch-electrodes 12 on the same side and reducing the impedance differences among the second wires 22.

In some embodiments, the total length L1 of the first touch-electrodes located at the most edge position in the second direction and the length P1 of the electrode block in the central region satisfy: $L1=n1 \times P1+C1$, where n1 is a positive integer, $0<C1<P1$, and $0<C1/P1<20\%$ or $80\%<C1/P1<100\%$, and an area of one of electrode blocks respectively located at the head position and the tail position of the first touch-electrodes located at the most edge position in the second direction is 70% less than the area of the electrode block 10 in the central region of the touch region 100; and/or the total length L2 of the second touch-electrodes located at the most edge position in the first direction and the length P2 of the electrode block in the central region satisfy: $L2=n2 \times P2+C2$, where n2 is a positive integer, $0<C2<P2$, and $0<C2/P2<20\%$ or $80\%<C2/P2<100\%$, and an area of one of the electrode blocks located at the head position and the tail position of the second touch-electrodes located at the most edge position in the first direction is 70% less than the area of the electrode block in the central region of the touch region.

Referring to FIG. 14, it first is to be noted that when the circular edge line of the touch region 100 is moved in the horizontal direction from left to right relative to the touch-electrode array, compared with the design in FIG. 15, the number of electrode blocks 10 of the second touch-electrode 1220 at the upper most edge in FIG. 14 may be one more than that in FIG. 15, and the premise is that the size of the touch region and the size of the electrode blocks satisfy a certain condition. Referring to FIG. 14, when the total length of the second touch-electrodes 1220 is about an integer multiple of the length of a whole electrode block, i.e., an electrode block 10 in the central region. It can be seen that when the edge line of the touch region is moved from left to right, an area of an electrode block 1002 at the left end will be reduced, while an electrode block 1002 at the right end will be increased, resulting in that the number of second touch-electrodes 1220 is increased by one. In this embodiment, in some embodiments, the total length L2 of the second touch-electrodes 1220 disposed at the most edge position in the first direction 1 and the length P2 of the electrode block 10 in the central region satisfy the following conditions: $L2=n2 \times P2+C2$, where n2 is a positive integer, $0<C2<P2$, and $0<C2/P2<20\%$ or $80\%<C2/P2<100\%$, that is, the total length of the second touch-electrodes 12 at the most edge is guaranteed to be about equal to an integer multiple of the length of the electrode block in the central region. In addition, in this embodiment, an area of an electrode block of at least one electrode block 10 at the head position or the tail position in the second touch-electrodes 12 is disposed to be 70% less than an area of an electrode block 10 in the central region of the touch region 100, which, essentially, limits each of the electrode blocks 10 located at two ends not to be an entire electrode block, so that the number of electrode blocks in the second touch-electrode 12 can be increased by one, and in such way, the number of first sub-touch-electrodes 111 can be increased, whereby connection ends of more first sub-touch-electrodes 111 can be disposed on the same side, and the impedance differences among various second wires 22 can be reduced.

For the first touch-electrodes arranged along the second direction 2, a total length L1 of the first touch-electrodes located at the most edge position in the second direction and a length P1 of an electrode block in the central region satisfy the following conditions: $L1=n1 \times P1+C1$, where n1 is a positive integer, $0<C1<P1$, and $0<C1/P1<20\%$ or $80\%<C1/P1<100\%$, to ensure that the total length of the first touch-electrodes at the most edge is equal to an integer multiple of the length of the electrode block in the central region. Further, an area of an electrode block of at least one electrode block 10 at the head position and the tail position is disposed to be 70% less than an area of an electrode block 10 in the central region of the touch region 100, which, essentially, limits each of the electrode blocks 10 located at two ends not to be an entire electrode block. Thus, the number of electrode blocks in the first touch-electrode 11 is increased by one, and the number of second sub-touch-electrodes 122 can be increased, so that connection ends of more second sub-touch-electrodes 122 are disposed on the same side, and the impedance differences among various first wires 21 are reduced. It can be understood by those skilled in the art that the arrangement principle of the first touch-electrodes at the most edge is the same as that of the second touch-electrodes at the most edge, except that the arrangement direction thereof is different, and no drawing is provided for illustration herein.

In other embodiments of the present disclosure, in addition to the circular touch region of the above example, in some embodiments, the touch region may be in a shape which is any one of a shape with rounded corners or a runway shape. In addition, in some embodiments, the touch panel may further be a touch display panel. The touch display panel has the same touch-electrode design as the touch panel. Both the touch panel and the touch display panel have a touch region and a bezel region, and both needs to have wires disposed in the bezel region to be connected to the touch-electrodes of the touch region, to provide touch signals to the touch-electrodes or receive the touch signals from the touch-electrodes.

Figure 16:
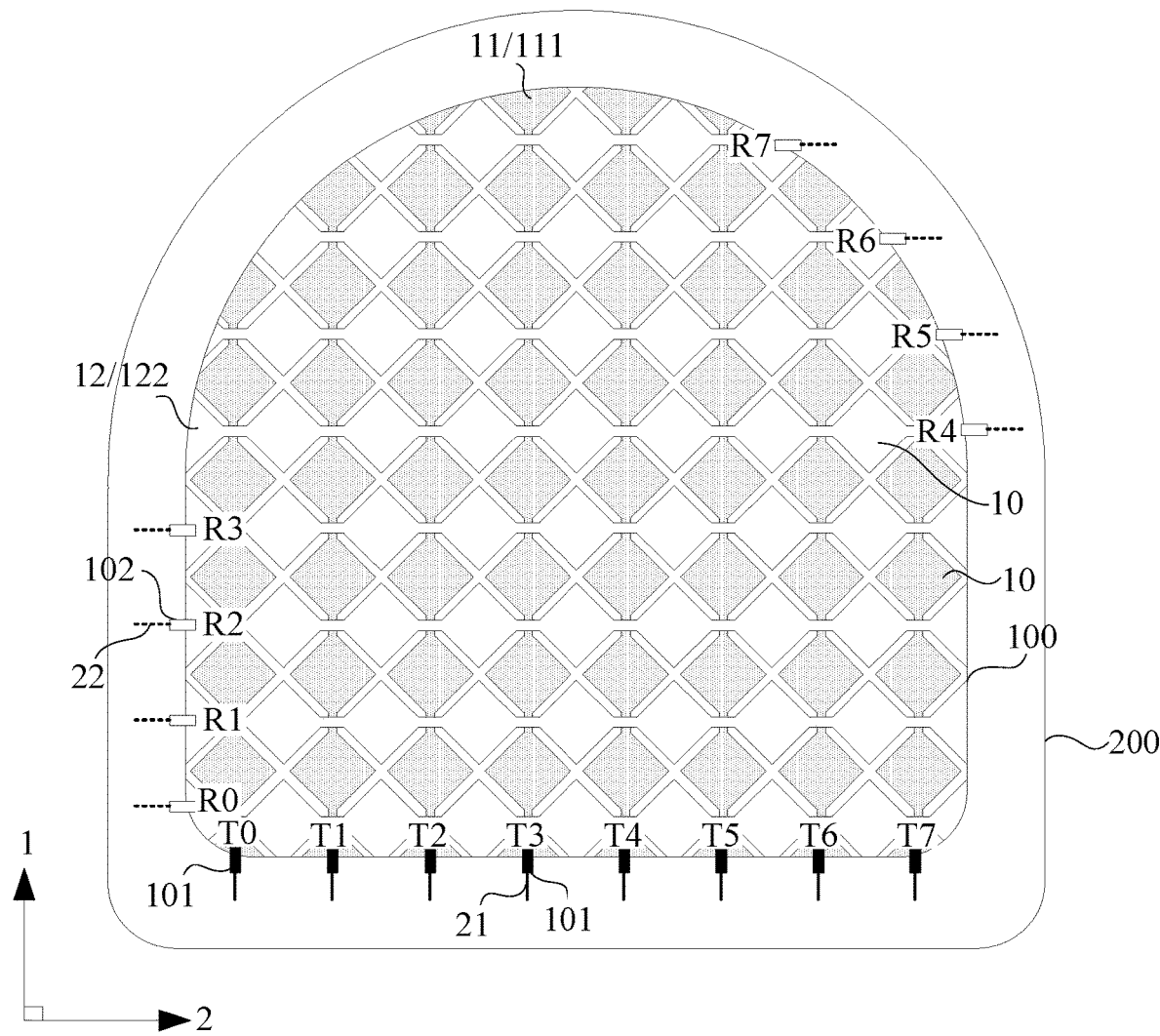
FIG. 16 is another structure diagram of a touch panel according to an embodiment of the present disclosure.

FIG. 16 is another structure diagram of a touch panel according to an embodiment of the present disclosure. Referring to FIG. 16, a touch region of the touch panel 100 is in the shape of a shape with rounded corners. In some embodiments, all the first touch-electrodes 11 intersect with all the second touch-electrodes 12, and the first connection ends 101 of all the first touch-electrodes 11 are disposed on the same side (as an example shown in the figure, all the first connection ends 101 of all the first touch-electrodes 11 are disposed on the lower side).

In this embodiment, the first connection ends 101 of the first touch-electrodes 11 are all disposed on the lower side, and accordingly, the length differences among the first wires 21 are relatively small, so that the impedance differences among the first wires 21 can be reduced, static electricity can be avoided to discharge in a fixed first wire and the anti-static-electricity capability of the whole touch panel can be improved.

Further, referring to FIG. 16, second connection ends 102 of second touch-electrodes 12 located at a first side of a center axis of the touch region 100 in the first direction 1 are located at a first side of the touch region 100 in the second direction 2, and second connection ends 102 of second touch-electrodes 12 located at a second side of the center axis of the touch region 100 in the first direction 1 are located at a second side of the touch region 100 in the second direction 2.

The first side and the second side of the center axis of the touch region 100 in the first direction 1 refer to the upper side and the lower side of the horizontal center axis. Herein, the second touch-electrodes 12 are divided into an upper portion and a lower portion according to the horizontal center axis. The connection ends of the second touch-electrodes 12 in the upper portion and the connection ends of the second touch-electrodes 12 in the lower portion can be respectively disposed on two sides opposite to each other in a row direction.

Figure 17:
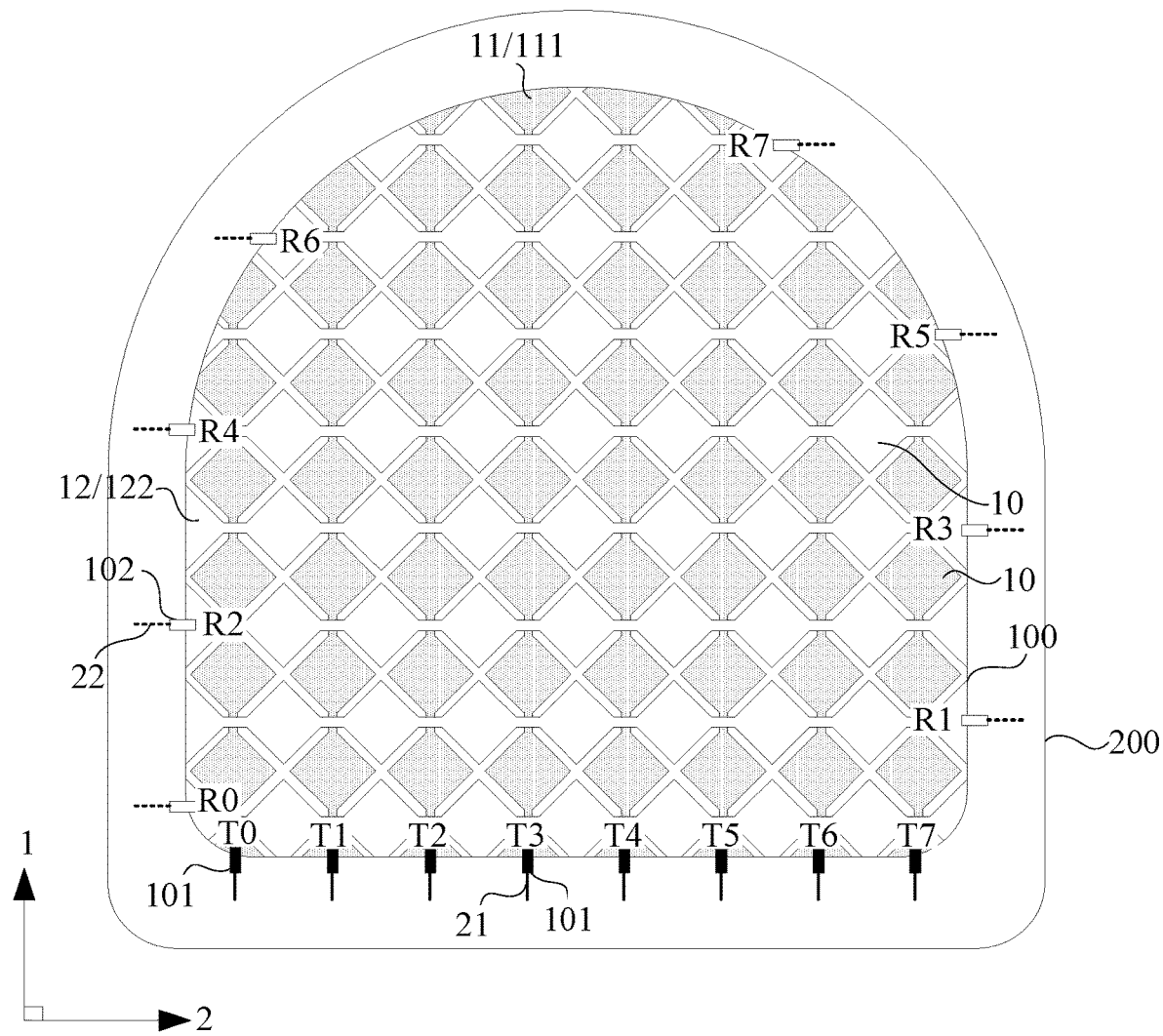
FIG. 17 is another structure diagram of a touch panel according to an embodiment of the present disclosure.

FIG. 17 is another structure diagram of a touch panel according to an embodiment of the present disclosure. Referring to FIG. 17, similarly, a touch region of the touch panel 100 is in the shape of a shape with rounded corners. Different from FIG. 16, second connection ends 102 of second touch-electrodes 12 disposed in the first direction 1 are alternately distributed on two sides of a central-axis of the touch region 100 in the second direction 2.

Herein, the connection ends of the second touch-electrodes 12 are designed to distribute differently. In this embodiment, the connection ends of the second touch-electrodes 12 extending in the horizontal direction are designed to be located at different sides in the horizontal direction according to a rule of alternate arrangement in the longitudinal direction. In other words, odd-th second touch-electrodes 12 are disposed on a same side, and even-th second touch-electrodes 12 are disposed on the other same side.

It is to be noted that the above two designs related to the connection ends of the second touch-electrodes are only two simple design examples and may be designed by those skilled in the art according to actual situations, which is not limited herein. It is also to be noted that as shown in FIG. 16 and FIG. 17, in the touch panel in a shape with rounded corners, the first touch-electrodes 11 intersect with all the second touch-electrodes 12, and the second touch-electrodes 12 intersect with all the first touch-electrodes 12, depending on the rounded corners having smaller radians. It can be understood that when the radians of the rounded corners are gradually increased to an extreme extent, the touch panel in a shape with rounded corners turns into a circular touch panel. That is, in a case where the touch panel in a shape with rounded corners having larger radians, a part of the first touch-electrodes 11 do not intersect with the second touch-electrodes 12, and a part of the second touch-electrodes do not intersect with the first touch-electrodes 11. That is, how the first touch-electrodes 11 intersect with the second touch-electrodes 12 in the touch panel in a shape with rounded corners is approximate to that in a circular touch panel, therefore, the design of the touch panel in a shape with rounded corners can be carried out according to the above-mentioned embodiments for the circular touch panel. Similarly, for the touch panel in a runway shape mentioned in the embodiments of the disclosure, how the touch-electrodes intersect in a local regions also conforms to that in the above-mentioned touch panel in a shape with rounded corners having smaller radians or conforms to that in the above mentioned circular touch panel, therefore, the design for the touch panel in a runway shape can be carried out according to the embodiments for the above-mentioned touch panel in a shape with rounded corners having smaller radians or according to the embodiments for the circular touch panel, which will not be repeated herein.

Figure 18:
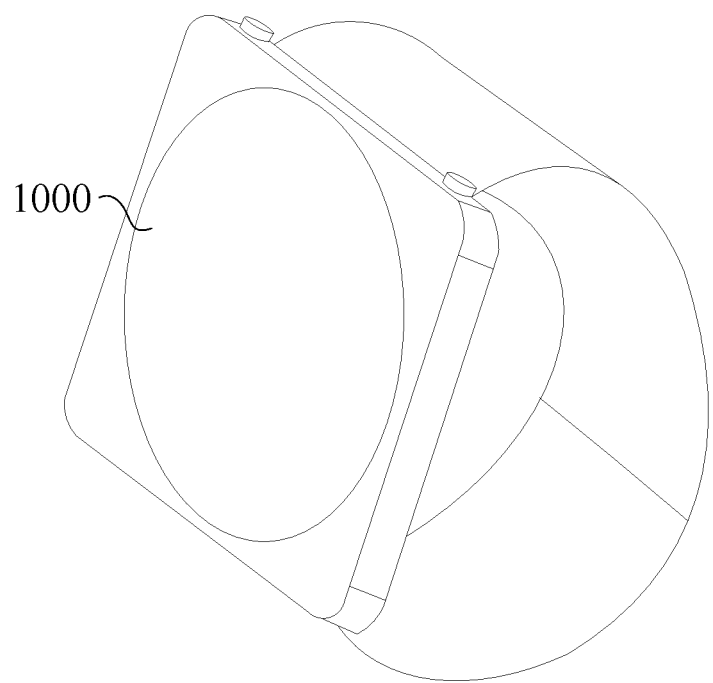
FIG. 18 is a structure diagram of a touch display apparatus according to embodiments of the present disclosure.

A touch display device is provided according to an embodiment of the present disclosure. FIG. 18 is a structure diagram of a touch display device according to an embodiment of the present disclosure. Referring to FIG. 18, the touch display device includes any touch panel 1000 provided by the above-mentioned embodiments. It is to be noted that the touch display device includes not only the touch panel 100, but also may include other circuits or devices for supporting normal operations of the touch display device. The touch display device may be a smart wearable device such as a smart watch, or may be a mobile phone, a tablet computer, a computer, a television, an in-vehicle display device, or the like, which is not limited in the embodiments of the present disclosure.

The touch display device includes the touch panel; therefore, the touch display device also has the beneficial effects of the touch panel described in the preceding embodiments, and for the same details, reference may be made to the description of the preceding touch panel, which will not be repeated herein.

What is claimed is:

1. A touch panel, comprising a touch region and a bezel region surrounding the touch region, wherein the touch panel further comprises: a plurality of first touch-electrodes and a plurality of second touch-electrodes, wherein the plurality of first touch-electrodes are insulated from the plurality of second touch-electrodes;

the plurality of first touch-electrodes extend along a first direction and are arranged in sequence along a second direction, and the plurality of second touch-electrodes extend along the second direction and are arranged in sequence along the first direction, wherein the first direction intersects with the second direction; and the bezel region comprises a plurality of first wires and a plurality of second wires, each of the plurality of first touch-electrodes comprises a first connection end, a second touch-electrode of the plurality of second touch-electrodes comprises a second connection end, each of the plurality of first wires is electrically connected a respective one of the plurality of first touch-electrodes in a one-to-one correspondence through a respective first connection end, and each of the plurality of second wires is electrically connected a respective one of the plurality of second touch-electrodes in a one-to-one correspondence through a respective second connection end; and, wherein the touch panel comprises at least one of the following:

at least part of the plurality of first touch-electrodes, which intersect with all of the plurality of second touch-electrodes, are first sub-touch-electrodes, at least two adjacent first sub-touch-electrodes of the first sub-touch-electrodes are located at a central position of the touch region in the second direction, first connection ends of the at least two adjacent first sub-touch-electrodes are located at a same side of the touch region in the first direction, a first connection end of a first sub-touch-electrode located at a most central position of the touch region in the second direction is located at a first side in the first direction; first wires, which are electrically connected to respective first sub-touch-electrodes with first connection ends located at a second side in the first direction, have a smallest resistance value R0; a first wire, which is electrically connected to a respective first sub-touch-electrode located at a most central position of the touch region in the second direction, has a resistance value R1; and one of the first wires, which are electrically connected to the respective first touch-electrodes with the first connection ends located at the second side in the first direction has a resistance value R2, wherein R0, R1 and R2 satisfy |R2-R1|/|R0-R1|<7.8/5.8, and R0<R2;

or, at least part of the plurality of second touch-electrodes, which intersect with all of the plurality of first touch-electrodes, are second sub-touch-electrodes, at least two adjacent second sub-touch-electrodes of the second sub-touch-electrodes are located at a central position of the touch region in the first direction, second connection ends of the at least two adjacent second sub-touch-electrodes are located at a same side of the touch region in the second direction, a second connection end of a second sub-touch-electrode located at a most central position of the touch region in the first direction is located at a first side in the second direction; second wires, which are electrically connected to respective second sub-touch-electrodes with second connection ends located at a second side in the second direction, have a smallest resistance value R0'; a second wire, which is electrically connected to a respective second sub-touch-electrode located at a most central position of touch region in the first direction, has a resistance value R1'; and one of the second wires, which are electrically connected to the respective second touch-electrodes with the second connection ends located at the second side in the second direction has a resistance value R2', wherein R0', R1' and R2' satisfies |R2'-R1'|/|R0'-R1'|<7.8/5.8, and R0'<R2'.

2. The touch panel according to claim 1, wherein the touch panel comprises at least one of the following:

N1 first touch-electrodes intersect with all of the plurality of second touch-electrodes, and first connection ends of M1 first sub-touch-electrodes are located at a same side of the touch region in the first direction, wherein N1 is a positive even integer, and N1 and M1 satisfy: M1 >N1/2;

or,

N2 second touch-electrodes intersect with all of the plurality of first touch-electrodes, and second connection ends of M2 second sub-touch-electrodes are located at a same side of the touch region in the second direction, wherein N2 is a positive even integer, and N2 and M2 satisfy: M2>N2/2.

3. The touch panel according to claim 1, wherein the touch panel comprises at least one of the following:

N1 first touch-electrodes intersect with all of the plurality of second touch-electrodes, and first connection ends of M1 first sub-touch-electrodes are located at a same side of the touch region in the first direction, wherein N1 is a positive odd integer, and N1 and M1 satisfy: M1≥ (N1+1)/2;

or,

N2 second touch-electrodes intersect with all of the plurality of first touch-electrodes, and second connection ends of M2 second sub-touch-electrodes are located at a same side of the touch region in the second direction, wherein N2 is a positive odd integer, and N2 and M2 satisfy: M2≥ (N2+1)/2.

4. The touch panel according to claim 1, wherein at least part of the plurality of first touch-electrodes, which do not intersect with at least one of the plurality of second touch-electrodes, are third sub-touch-electrodes, and at least part of the plurality of second touch-electrodes, which do not intersect with at least one of the plurality of first touch-electrodes, are fourth sub-touch-electrodes;

a first connection end of a third sub-touch-electrode of the third sub-touch-electrodes located at a first side of a center axis of the touch region in the second direction is located at a first side of the touch region in the first direction, and a first connection end of a third sub-touch-electrode of the third sub-touch-electrodes located at a second side of the center axis of the touch region in the second direction is located at a second side of the touch region in the first direction; and a second connection end of a fourth sub-touch-electrode of the fourth sub-touch-electrodes located at the first side of the center axis of the touch region in the first direction is located at a second side of the touch region in the second direction, and a second connection end of a fourth sub-touch-electrode of the fourth sub-touch-electrodes located at the second side of the center axis of the touch region in the first direction is located at a first side of the touch region in the second direction.

5. The touch panel according to claim 1, wherein at least part of the plurality of first touch-electrodes, which do not intersect with at least one of the plurality of second touch-electrodes, are third sub-touch-electrodes, at least part of the plurality of second touch-electrodes, which do not intersect with at least one of the plurality of first touch-electrodes, are fourth sub-touch-electrodes; and wherein first connection ends of the third sub-touch-electrodes adjacent to a central-axis of the touch region in the second direction are located at a same side of the touch region in the first direction; or, second connection ends of the fourth sub-touch-electrodes adjacent to a central-axis of the touch region in the first direction are located at a same side of the touch region in the second direction.

6. The touch panel according to claim 1, wherein a first touch-electrode of the plurality of first touch-electrodes and a second touch-electrode of the plurality of second touch-electrodes each comprises a plurality of electrode blocks sequentially connected in series, the plurality of electrode blocks in the first touch-electrode and the plurality of electrode blocks in the second touch-electrode do not overlap, and a connection structure of the plurality of electrode blocks in the first touch-electrode and a connection structure of the plurality of electrode blocks in the second touch-electrode form a cross-bridge structure and are insulated from each other;

wherein at least part of the plurality of first touch-electrodes, which are located at an edge position of the touch region in the second direction and are extended to the bezel region, are fifth sub-touch-electrodes; and at least part of the plurality of second touch-electrodes, which are located at an edge position of the touch region in the first direction and are extended to the bezel region, are sixth sub-touch-electrodes; and wherein first connection ends of at least part of the fifth sub-touch-electrodes, which intersect with all of the plurality of second touch-electrodes, are located at a same side of the touch region in the first direction with first connection ends of first sub-touch-electrodes which are located at a most central position of the touch region in the second direction; or second connection ends of at least part of sixth sub-touch-electrodes which intersect with all of the plurality of first touch-electrodes, are located at a same side of the touch region in the second direction with first connection ends of second sub-touch-electrodes which are located at a most central position of the touch region in the first direction.

7. The touch panel according to claim 1, wherein all of the plurality of first touch-electrodes intersect with all of the plurality of second touch-electrodes, and first connection ends of all of the plurality of first touch-electrodes are disposed on a same side;

second connection ends of second touch-electrodes of the plurality of second touch-electrodes located at a first side of a center axis of the touch region in the first direction are located at a first side of the touch region in the second direction; and second connection ends of second touch-electrodes of the plurality of second touch-electrodes located at a second side of the center axis of the touch region in the first direction are located at a second side of the touch region in the second direction;

or, wherein second connection ends of second touch-electrodes of the plurality of second touch-electrodes arranged in sequence in the first direction are alternately distributed on two sides of a central-axis of the touch region in the second direction.

8. The touch panel according to claim 1, wherein the bezel region comprises an access region, wherein the access region is located at a first side of the touch region in the first direction, and first connection ends of at least two adjacent first touch-electrodes located at a central position of the touch region in the second direction are located at a first side of the touch region in the first direction; and wherein a width of a first wire of at least part of the plurality of first wires corresponding to a first touch-electrode with a first connection end located at a second side of the touch region in the first direction is greater than a width of a first wire of the plurality of first wires corresponding to a first touch-electrode with a first connection end located at a first side of the touch region in the first direction.

9. The touch panel according to claim 1, wherein the bezel region comprises an access region, and the access region is located at a first side of the touch region in the first direction; and a width of a first wire of at least part of the plurality of first wires corresponding to a first touch-electrode with a first connection end located at a second side of the touch region in the first direction is greater than a width of a first wire of at least part of the plurality of first wires corresponding to a first touch-electrode with a first connection end located at a first side of the touch region in the first direction.

10. A touch display device, comprising a touch panel, wherein the touch panel comprises:

a touch region and a bezel region surrounding the touch region, wherein the touch panel further comprises: a plurality of first touch-electrodes and a plurality of second touch-electrodes, wherein the plurality of first touch-electrodes are insulated from the plurality of second touch-electrodes;

the plurality of first touch-electrodes extend along a first direction and are arranged in sequence along a second direction, and the plurality of second touch-electrodes extend along the second direction and are arranged in sequence along the first direction, wherein the first direction intersects with the second direction; and the bezel region comprises a plurality of first wires and a plurality of second wires, each of the plurality of first touch-electrodes comprises a first connection end, a second touch-electrode of the plurality of second touch-electrodes comprises a second connection end, each of the plurality of first wires is electrically connected a respective one of the plurality of first touch-electrodes in a one-to-one correspondence through a respective first connection end, and each of the plurality of second wires is electrically connected a respective one of the plurality of second touch-electrodes in a one-to-one correspondence through a respective second connection end; and, wherein the touch panel comprises at least one of the following:

at least part of the plurality of first touch-electrodes, which intersect with all of the plurality of second touch-electrodes, are first sub-touch-electrodes, at least two adjacent first sub-touch-electrodes of the first sub-touch-electrodes are located at a central position of the touch region in the second direction, first connection ends of the at least two adjacent first sub-touch-electrodes are located at a same side of the touch region in the first direction, a first connection end of a first sub-touch-electrode located at a most central position of the touch region in the second direction is located at a first side in the first direction; first wires, which are electrically connected to respective first sub-touch-electrodes with first connection ends located at a second side in the first direction, have a smallest resistance value R0; a first wire, which is electrically connected to a respective first sub-touch-electrode located at a most central position of the touch region in the second direction, has a resistance value R1; and one of the first wires, which are electrically connected to the respective first touch-electrodes with the first connection ends located at the second side in the first direction has a resistance value R2, wherein R0, R1 and R2 satisfy $|R2-R1|/|R0-R1|<7.8/5.8$, and $R0 \leq R2$;

or, at least part of the plurality of second touch-electrodes, which intersect with all of the plurality of first touch-electrodes, are second sub-touch-electrodes, at least two adjacent second sub-touch-electrodes of the second sub-touch-electrodes are located at a central position of the touch region in the first direction, second connection ends of the at least two adjacent second sub-touch-electrodes are located at a same side of the touch region in the second direction, a second connection end of a second sub-touch-electrode located at a most central position of the touch region in the first direction is located at a first side in the second direction; second wires, which are electrically connected to respective second sub-touch-electrodes with second connection ends located at a second side in the second direction, have a smallest resistance value $R0'$; a second wire, which is electrically connected to a respective second sub-touch-electrode located at a most central position of touch region in the first direction, has a resistance value $R1'$; and one of the second wires, which are electrically connected to the respective second touch-electrodes with the second connection ends located at the second side in the second direction has a resistance value $R2'$, wherein $R0'$, $R1'$ and $R2'$ satisfies $|R2'-R1'|/|R0'-R1'| \leq 7.8/5.8$, and $R0'<R2'$.

\* \* \* \* \*